(12) United States Patent
Guo et al.

(10) Patent No.: US 12,387,425 B2
(45) Date of Patent: Aug. 12, 2025

(54) METHOD FOR GENERATING FIREWORK VISUAL EFFECT, VIDEO GENERATION METHOD, AND ELECTRONIC DEVICE

(71) Applicant: Beijing Zitiao Network Technology Co., Ltd., Beijing (CN)

(72) Inventors: Yi Guo, Beijing (CN); Jiali Pan, Beijing (CN); Xiaole Xue, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 142 days.

(21) Appl. No.: 18/023,939

(22) PCT Filed: Nov. 23, 2021

(86) PCT No.: PCT/CN2021/132438
§ 371 (c)(1),
(2) Date: Feb. 28, 2023

(87) PCT Pub. No.: WO2022/142869
PCT Pub. Date: Jul. 7, 2022

(65) Prior Publication Data
US 2023/0326123 A1      Oct. 12, 2023

(30) Foreign Application Priority Data

Dec. 28, 2020 (CN) .......................... 202011584162.6

(51) Int. Cl.
*G06T 15/50* (2011.01)
*G06T 7/73* (2017.01)
*H04N 5/272* (2006.01)

(52) U.S. Cl.
CPC ................ *G06T 15/50* (2013.01); *G06T 7/73* (2017.01); *H04N 5/272* (2013.01);
(Continued)

(58) Field of Classification Search
CPC . G06T 15/50; G06T 7/73; G06T 2207/10016; G06T 2210/56
See application file for complete search history.

(56) References Cited

U.S. PATENT DOCUMENTS

2013/0346588 A1    12/2013  Zhang et al.
2018/0239848 A1*    8/2018  Teng ....................... G06F 30/20
(Continued)

FOREIGN PATENT DOCUMENTS

CN          106910201 A        6/2017
CN          108829893 A        11/2018
(Continued)

OTHER PUBLICATIONS

Reeves, William T. "Particle systems—a technique for modeling a class of fuzzy objects." Seminal graphics: pioneering efforts that shaped the field. 1998. 203-220. (Year: 1998).*

(Continued)

*Primary Examiner* — Grace Q Li
(74) *Attorney, Agent, or Firm* — Astute IP Law Group

(57) ABSTRACT

A generation method for generating a firework visual effect, a video generation method, an electronic device, and a non-transient computer readable storage medium are provided. The generation method includes: generating a center particle set and a spark particle set, the center particle set being used for forming a center part of the firework visual effect, and the spark particle set being used for forming a spark part moving along a path away from the center part in the firework visual effect; rendering particles in the center particle set to obtain a center particle primitive model set; rendering particles in the spark particle set to obtain a spark particle primitive model set; and superimposing the center particle primitive model set and the spark particle primitive model set to generate the firework visual effect.

19 Claims, 10 Drawing Sheets

(52) U.S. Cl.
CPC ............... *G06T 2207/10016* (2013.01); *G06T 2207/30196* (2013.01); *G06T 2207/30241* (2013.01); *G06T 2210/56* (2013.01); *G06T 2210/62* (2013.01)

(56) References Cited

U.S. PATENT DOCUMENTS

| | | | | |
|---|---|---|---|---|
| 2018/0336712 | A1* | 11/2018 | Akaike | ............... G06T 13/60 |
| 2018/0357810 | A1 | 12/2018 | Young et al. | |
| 2020/0035034 | A1* | 1/2020 | Wang | ............... G06T 7/0002 |

FOREIGN PATENT DOCUMENTS

| | | | |
|---|---|---|---|
| CN | 108921927 | A | 11/2018 |
| CN | 109461205 | A | 3/2019 |
| CN | 110163982 | A | 8/2019 |
| CN | 110415326 | A | 11/2019 |
| CN | 111353071 | A | 6/2020 |
| CN | 112199526 | A | 1/2021 |
| CN | 112529997 | A | 3/2021 |
| EP | 1085470 | A2 | 3/2001 |
| JP | 2001246151 | A | 9/2001 |

OTHER PUBLICATIONS

Gao, Xiuting, "Research on Real-Time Rendering Simulation Technology for Flame and Fireworks Based on Particle System," Chinese Doctoral Dissertations & Master's Theses Full-text Database (Master), Information Science and Technology, Issue 6, Jun. 15, 2012, 61 pages, with English Abstract.

Li, Hai, "Animation of Fireworks Based on Particle System," Chinese Doctoral Dissertations & Master's Theses Full-text Database (Master), Information Science and Technology, Nov. 15, 2013, Issue 11, Chapter 4, 21 pages, with English Abstract.

Zhang et al., "Fireworks Simulation Based on Particle System," 2009 Second International Conference on Information and Computing Science, Dec. 31, 2009, pp. 187-190.

International Search Report and Written Opinion for International Application No. PCT/CN2021/117199, mailed on Dec. 17, 2021, 14 pages.

International Search Report and Written Opinion for International Application No. PCT/CN2021/132438, mailed on Feb. 24, 2022, 14 pages.

\* cited by examiner

C31

S20 Determining a target position in a to-be-processed video

S21 Displaying a firework visual effect at the target position

S22 Generating a video with the firework visual effect superimposed

METHOD FOR GENERATING FIREWORK VISUAL EFFECT, VIDEO GENERATION METHOD, AND ELECTRONIC DEVICE

CROSS-REFERENCE TO RELATED APPLICATION

The present application is a 35 U.S.C. 371 National Phase of International Application No. PCT/CN2021/132438, filed on Nov. 23, 2021, which claims the priority of Chinese Patent Application No. 202011584162.6, filed on Dec. 28, 2020, the disclosures of which are incorporated herein by reference as part of the present application.

TECHNICAL FIELD

An embodiment of the present disclosure relates to a generation method of a firework visual effect, a video generation method, an electronic device, and a non-transient computer readable storage medium.

BACKGROUND

A three-dimensional computer graphics technology can be used for rendering a virtual three-dimensional space in a computer, and three-dimensional objects in the three-dimensional space are depicted in a discrete mathematical expression form (such as a triangular face). These discrete three-dimensional objects are called 3D (3-dimension) models. In the three-dimensional space, colors, sense of reality, light, and shadow effects and the like finally presented by these three-dimensional models are defined and depicted through a series of graphics algorithms and rules. These algorithms and encapsulations defining which colors the three-dimensional object is visually presented in are generally called three-dimensional model materials.

In three-dimensional computer graphics, a particle system can be used for simulating special effects such as fire, explosion, smoke, water flow, sparks, falling leaves, cloud, fog, snow, dust, meteor trail, and light-emitting trajectories. However, how to obtain a realistic firework visual effect based on the particle system is an urgent problem for those skilled in the art.

SUMMARY

The part of the summary is provided so as to introduce the ideas in a brief form, these ideas will be described in detail in the later specific embodiments. The part of the summary is not intended to identify the key features or necessary features of the technical solution required to be protected, nor is it intended to limit the scope of the technical solution required to be protected.

At least one embodiment of the present disclosure provides a generation method for generating a firework visual effect, comprising: generating a center particle set and a spark particle set, where the center particle set is used for forming a center part of the firework visual effect, and the spark particle set is used for forming a spark part moving along a path away from the center part in the firework visual effect; rendering particles in the center particle set to obtain a center particle primitive model set; rendering particles in the spark particle set to obtain a spark particle primitive model set; and superimposing the center particle primitive model set and the spark particle primitive model set to generate the firework visual effect.

At least one embodiment of the present disclosure provides a video generation method, comprising: determining a target position in a to-be-processed video; displaying a firework visual effect at the target position, where the firework visual effect is generated by the generation method according to any embodiment of the present disclosure; and generating a video with the firework visual effect superimposed.

At least one embodiment of the present disclosure provides an electronic device, comprising: a memory for non-transiently storing computer readable instructions; and a processor for running the computer readable instructions, when the computer readable instructions are run by the processor, the generation method for generating a firework visual effect according to any embodiment of the present disclosure is implemented.

At least one embodiment of the present disclosure provides a non-transient computer readable storage medium, the non-transient computer readable storage medium stores computer readable instructions, and when the computer readable instructions are run by the processor, the generation method for generating a firework visual effect according to any embodiment of the present disclosure is implemented.

BRIEF DESCRIPTION OF THE DRAWINGS

The foregoing and other features, advantages, and aspects of the embodiments of the present disclosure will become more apparent in connection with the accompanying drawings and with reference to the following specific implementations. Throughout the accompanying drawings, identical or similar reference numerals indicate identical or similar elements. It should be understood that the accompanying drawings are schematic and that the components and elements are not necessarily to be drawn in a real scale.

DETAILED DESCRIPTION

Figure 1:
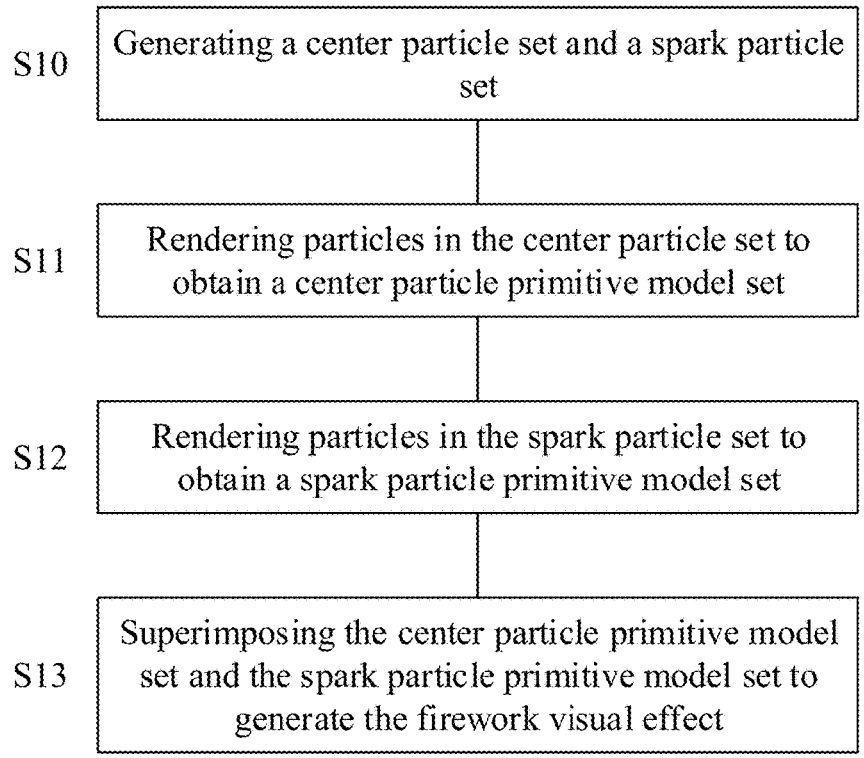
FIG. 1 is a schematic flowchart of a generation method for generating a firework visual effect provided by at least one embodiment of the present disclosure.

Embodiments of the present disclosure will be described in greater detail below with reference to the accompanying drawings. While some embodiments of the present disclosure are shown in the accompanying drawings, it should be understood, however, that the present disclosure may be implemented in various forms and should not be construed as being limited to the embodiments set forth herein; on the contrary, these embodiments are provided for a more thorough and complete understanding of the present disclosure. It should be understood that the accompanying drawings and embodiments of the present disclosure are for exemplary purposes only and are not intended to limit the scope of protection of the present disclosure.

It should be understood that all the steps recorded in the implementations of the method provided by the present disclosure can be performed in different order, and/or performed in parallel. Further, the implementations of the method can include additional steps and/or omit performing the steps illustrated. The scope of the present disclosure is not limited in this respect.

The term "comprise/include" and variations thereof as used herein mean openly comprising/including, i.e. "comprising/including but not limited to". The term "based on" is "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first", "second", etc. mentioned in the present disclosure are only used for distinguishing different devices, modules, or units, and are not intended to limit the order or interdependence of the functions performed by these devices, modules, or units.

It should be noted that the modifications of "one" and "plurality" mentioned in the present disclosure are schematic rather than restrictive, and those skilled in the art should understand that unless otherwise expressly indicated in the context, it should be understood as "one or more".

The names of messages or information interacted between a plurality of devices in the embodiments of the present disclosure are used for illustrative purposes only and are not used to limit the scope of such messages or information.

In graphics, a particle effect refers to a special rendering effect capability package. A group of point sets, namely a plurality of particles, are generated in a three-dimensional space, then each particle in the point sets is replaced with a three-dimensional model (the most common model is a plane model), and the three-dimensional model is rendered with a specific material to generate a visual effect of the particles. The visual effect of the particles is a special effect that is visible to the eye.

The particle effect is commonly used for creating visual special effects such as cloud and mist, flame, and the like. CPU (Central Processing Unit) particles and GPU (Graphics Processing Unit) particles are two technical means for achieving the particle effect. In the embodiments of the present disclosure, the firework visual effect can include the visual effect displayed on a display interface of an electronic device.

Each single particle in the particle effect has a complete particle lifecycle, including an initialization stage, an update stage, and a rendering stage, and after the rendering stage is finished, a particle primitive model corresponding to the particle can be generated.

At least one embodiment of the present disclosure provides a generation method for generating a firework visual effect, a video generation method, an electronic device, and a non-transient computer readable storage medium. The generation method for generating the firework visual effect comprises: generating a center particle set and a spark particle set, the center particle set being used for forming a center part of the firework visual effect, and the spark particle set being used for forming a spark part moving along a path away from the center part in the firework visual effect; rendering particles in the center particle set to obtain a center particle primitive model set; rendering particles in the spark particle set to obtain a spark particle primitive model set; and superimposing the center particle primitive model set and the spark particle primitive model set to generate the firework visual effect.

The generation method of the firework visual effect can implement firework visual effects (e.g., handheld fireworks, etc.) of different types through a plurality of particle sets, the generated firework visual effects are 3D visual effects, which have rich and realistic 3D effects, thus enhancing the visual experience of a user; besides, the generation method of the firework visual effect can achieve generating the firework visual effect in real time on a mobile terminal, so as to meet the requirements of various application scenarios.

It is to be noted that the generation method of the firework visual effect provided by the embodiment of the present disclosure can be at least partially applied to an appropriate electronic device, for example, in some examples, the generation method of the firework visual effect can be implemented in an application installed in the electronic device or by a non-installed application downloaded by, for example, a cloud server. The electronic device can include a personal computer, a mobile terminal, etc., and the mobile terminal can be a mobile phone, a tablet computer, a wearable electronic device, a smart home device, etc. For example, in some embodiments, the generation method for generating the firework visual effect can also be implemented by a server, or part of the steps in the generation method of the firework visual effect can be implemented by a server (e.g., a cloud server) and another part of the steps in the generation method of the firework visual effect can be implemented by the electronic device, the server and the electronic device communicate with each other, for example, via a network (e.g., a wireless or wired communication network).

In the embodiment of the present disclosure, the firework visual effect can include a visual effect displayed on a display interface of the electronic device. The firework visual effect represents a special effect which is generated based on the particle set and can be displayed on the terminal, and is a visually visible effect.

The embodiments of the present disclosure are described in detail below in conjunction with the accompanying drawings, but the present disclosure is not limited to these specific embodiments.

FIG. 1 is a schematic flowchart of a generation method for generating a firework visual effect provided by at least one embodiment of the present disclosure.

For example, as shown in FIG. 1, the generation method for generating the firework visual effect comprises steps S10 to S13.

Step S10: generating a center particle set and a spark particle set.

Step S11: rendering particles in the center particle set to obtain a center particle primitive model set.

Step S12: rendering particles in the spark particle set to obtain a spark particle primitive model set.

Step S13: superimposing the center particle primitive model set and the spark particle primitive model set to generate the firework visual effect.

The generation method of the firework visual effect can implement the firework visual effect through the plurality of particle sets, the firework visual effect has the rich and realistic 3D effect, thus improving the visual experience of the user. In some embodiments, the generation method of the firework visual effect can simulate a real firework effect. The generation method of the firework visual effect can also achieve the effect of displaying the firework visual effect and a target object in a video in an superimposed manner by combining AR (Augmented Reality), target object detection, and other technologies, for example, the firework visual effect and the target object can be superimposed and displayed in the video through, for example, the AR technology.

For example, the center particle set is used for forming a center part of the firework visual effect, i.e., the center particle set is used for simulating the effect of the center of a firework. The spark particle set is used for forming a spark part of the firework visual effect, and the spark part moves along a path away from the center part, i.e., the spark particle set is used for simulating the effect of the spark debris of the firework flying along the direction away from the center of the firework, thus reflecting the spark scattered around during the firework setting-off process.

For example, the firework visual effect can be the visual effect of the handheld firework. The handheld firework can be a fairy stick firework and the like.

For example, the firework visual effect is a three-dimensional dynamic visual effect. In case that the firework visual effect is used to form a video, the firework visual effects displayed in respective video frames in the video can be different from each other.

For example, the center particle set and the spark particle set are both generated based on the GPU particle technology or the CPU particle technology.

For example, in step S10, the center particle set and the spark particle set both can be generated in the three-dimensional space determined based on a virtual three-dimensional coordinate system, and the three-dimensional space can represent a virtual three-dimensional space. It should be noted that a two-dimensional plane can be a special case of the three-dimensional space, that is, if a certain dimension of the three-dimensional space is 0, the three-dimensional space represents a two-dimensional plane.

For example, the center particle set can include a plurality of center particles. In the step S10, the generating the center particle set includes: generating the plurality of center particles at a first generation rate, and setting an attribute value of a corresponding center particle attribute for each center particle to obtain a plurality of center particle attribute values.

For example, the plurality of center particle attribute values are in one-to-one correspondence to the plurality of center particles, namely, each center particle has a corresponding center particle attribute value.

For example, the center particle attribute corresponding to each center particle has various attribute data. These attribute data will affect the overall rendering effect of each center particle, for example, the center particle attribute includes any combination of the following attributes: particle lifecycle, particle size, particle color, particle transparency, particle mass, particle orientation, particle position, particle speed, particle rotation angle, and the like. The center particle attribute corresponding to the center particle can be reflected on the center particle primitive model corresponding to the center particle and obtained by rendering the center particle. For example, if the particle size in the center particle attribute corresponding to the center particle is set to be 1 meter(m)*1 m, it indicates that the size of the center particle primitive model corresponding to the center particle is 1 m*1 m after the center particle is rendered. The particle lifecycle in the center particle attribute corresponding to the center particle is the lifecycle of the center particle primitive model corresponding to the center particle.

It is to be noted that in the present disclosure, "meter (m)" is the unit of dimension in the three-dimensional space defined by the virtual three-dimensional coordinate system.

For example, in case of generating each center particle, an initial attribute value can be set for the center particle attribute corresponding to the center particle, and the initial attribute value can include the initial value of the particle size corresponding to the center particle, the initial value of the particle color corresponding to the center particle, the initial value of the particle transparency corresponding to the center particle, the initial value of the particle mass corresponding to the center particle, the initial value of the particle orientation corresponding to the center particle, the initial value of the particle position corresponding to the center particle, the initial value of the particle speed corresponding to the center particle, the initial value of the particle rotation angle corresponding to the center particle, and the like. In addition, in the particle lifecycle of the center particle, the electronic device can update the attribute value of the center particle attribute corresponding to the center particle based on the preset setting.

The first generation rate represents the rate at which the center particles are generated, i.e., the plurality of center particles in the center particle set can be generated at a fixed first generation rate, for example, the first generation rate represents that Q1 center particles are generated per second. For example, in some embodiments, generating Q1 center particles per second can represent generating one center particle every 1/(Q1) second. The specific value of Q1 can be selected according to the actual effect and is not limited in the present disclosure.

In some embodiments, the initial generation positions (i.e., the positions where the particles are generated) of all the particles in the center particle set are the same, for example, the initial generation positions are at the origin of the virtual three-dimensional coordinate system. In other embodiments, the initial generation positions corresponding to all the particles in the center particle set are in a first three-dimensional region including the origin of the virtual three-dimensional coordinate system, that is, the initial generation position corresponding to each center particle can be set to any position in the first three-dimensional region, such as the center of the first three-dimensional region.

For example, the center of the first three-dimensional region can be the origin of the virtual three-dimensional coordinate system.

For example, the first three-dimensional region can be a spherical region, a cube region, and the like. The size of the first three-dimensional region does not exceed a size threshold, the size threshold can be set according to specific conditions, and the present disclosure does not limit this.

It should be noted that the present disclosure is not limited to the above-described conditions, and in some embodiments, the initial generation position corresponding to each particle in the center particle set can be in any three-dimensional region in the three-dimensional space, and the size of the any three-dimensional region does not exceed the size threshold.

The particle lifecycle of each center particle can be relatively short, which makes it easier to show the effect of the firework flickering and changing. For example, the particle lifecycle in each center particle attribute can be within a first lifecycle range, e.g., the first lifecycle range can be set according to the actual situation, and the present disclosure does not limit the first lifecycle range.

The particle speed corresponding to each center particle can be an arbitrary value, such as 0, that is, each center particle does not move in its particle lifecycle.

In some embodiments, the step S11 can include: respectively rendering the plurality of center particles based on the plurality of center particle attribute values to obtain the center particle primitive model set.

The center particle set corresponds to at least one center particle map group.

In the step S11, the respectively rendering the plurality of center particles based on the plurality of center particle attribute values to obtain the center particle primitive model set includes: for each center particle, obtaining a corresponding center particle map group, and rendering each center particle based on the corresponding center particle map group and the corresponding center particle attribute value to obtain the center particle primitive model corresponding to each center particle.

For example, the center particle primitive model set includes a plurality of center particle primitive models corresponding to the plurality of center particles, respectively.

For example, in each rendering process of each center particle, firstly, the state of the center particle attribute of the center particle at the rendering moment is determined, and the center particle attribute value corresponding to the center particle is updated based on the state of the center particle attribute to obtain the updated center particle attribute value; then, the center particle map group corresponding to the center particle is obtained; and the center particle is rendered based on the corresponding center particle map group and the updated center particle attribute value so as to obtain the center particle primitive model corresponding to the center particle.

In the particle lifecycle of each center particle, the center particle attribute value corresponding to the center particle is updated according to the rendering frame rate, and the center particle is rendered based on the updated center particle attribute value and the corresponding center particle map group so as to obtain the center particle primitive model corresponding to the center particle, and therefore, the change of the center particle primitive model with time can be simulated to obtain more realistic and rich visual effects.

For example, in the rendering process, the rendering frame rate can be set according to the actual conditions, e.g., the rendering frame rate can be 5 times/second, 10 times/second, and the like.

For example, in the rendering process, the center map corresponding to each center particle is always oriented toward a virtual camera, namely the position and direction of a lens of the virtual camera. For example, each of the plurality of center particles can be rendered multiple times, in each rendering process of a center particle, the center map, which is adopted, in the corresponding center map group has a random rotation angle, in a plane facing the virtual camera adopted for rendering, around the normal of the plane. In case of rendering each center particle, a certain initial random rotation angle can be set, thus the superimposed effect of the plurality of particle primitive models will be more realistic. It is to be noted that the "rotation angle" herein is not a dynamic speed, but a static "direction", the "rotation angle" herein refers to a rotation offset of the plane model, corresponding to the particle and generated in the rendering stage, around an axis (the direction of a plane model toward the virtual camera) on the premise of ensuring that the plane model faces the virtual camera.

For example, the particle rotation angle in each center particle attribute is used for representing the random rotation angle described above. For example, in case of generating the center particle, an angle can be randomly selected from 0 degree to 360 degrees and is set as the initial value of the particle rotation angle in the center particle attribute corresponding to the center particle.

In the present disclosure, the rendering mode of the center particle set is a patch model, that is, each center particle is rendered in a form of the patch model in combination with a specific material. Therefore, each center particle primitive model can be the patch model, such as a triangular patch model.

For example, the plurality of center particles can include a plurality of first center particles. The plurality of first center particles include a first group of first center particles (the first center particles in the first group of first center particles are described as first center particles A hereinafter) and a second group of first center particles (the first center particles in the second group of first center particles are described as first center particles B hereinafter).

The first center particle A and the first center particle B are basically consistent, and the main difference is that: 1, the particle size of the first center particle A and the particle size of the first center particle B are different; and 2, in the rendering process, the center map corresponding to the first center particle A is different from the center map corresponding to the first center particle B. The related attribute information of the first center particle A and the second center particle B is described below.

For example, the initial value of the particle size corresponding to each first center particle A can be a random value in a first center size range, that is, a value can be randomly selected from the first center size range to be set as the initial value of the particle size corresponding to any first center particle A. The first center size range can be set according to actual conditions, and the present disclosure does not limit the first center size range.

For example, the particle size corresponding to each first center particle A changes in the particle lifecycle of each first center particle A, for example, the particle size corresponding to any first center particle A is expanded from the initial value of the particle size corresponding to any first center particle A to N times the initial value of the particle size corresponding to the first center particle A, and N is greater than 1. The change in particle size corresponding to each first center particle A in conjunction with a relatively short particle lifecycle can be used to represent the effect of the flame spreading outward in the firework visual effect.

For example, the particle color in the center particle attribute corresponding to each first center particle A can be an arbitrary color, e.g., in some embodiments, the color represented by the initial value of the particle color of the center particle attribute corresponding to each first center particle A can be, for example, white. In order to improve the brightness of the center of the firework, the particle color corresponding to each first center particle A can be integrally brightened.

It is to be noted that in the present disclosure, the color can be set, for example, specifically by using RGB values.

For example, in some embodiments, the particle color corresponding to the first center particle A can be kept unchanged in the particle lifecycle of the first center particle A.

For example, the initial value of the particle transparency of the center particle attribute corresponding to each first center particle A can be an arbitrary value, e.g., in some examples, the initial value of the particle transparency of the center particle attribute corresponding to each first center particle A can be 1, that is, each first center particle A is completely non-transparent. If the value of the particle transparency is 0, it indicates that each first center particle A is completely transparent. The closer the value of the particle transparency is to 1, the more non-transparent the particle is, and the closer the value of the particle transparency is to 0, the more transparent the particle is.

In some examples, the particle transparency corresponding to the first center particle A can be kept unchanged in the particle lifecycle of the first center particle A.

It should be noted that, in the particle set (e.g., the center particle set/spark particle set), the final display color of the particle primitive model corresponding to each particle is the result of multiplying the particle color by the map color of the map, that is, is the effect of superimposing the particle color and the map color, and the final display transparency of the particle primitive model corresponding to each particle is the result of multiplying the particle transparency by the map transparency of the map, that is, is the result of superimposing the particle transparency and the map transparency.

In one embodiment, the initial value of the particle size corresponding to each first center particle B can be greater than or equal to the initial value of the particle size corresponding to each first center particle A. The initial value of the particle size corresponding to each first center particle B can be a random value in a second center size range, that is, a value can be randomly selected from the second center size range to be set as the initial value of the particle size corresponding to any first center particle B. The second center size range can be set according to actual conditions, and the present disclosure does not limit the second center size range.

For example, the particle size corresponding to each first center particle B also changes in the particle lifecycle of each first center particle B, for example, the particle size corresponding to any first center particle B is expanded from the initial value of the particle size corresponding to any first center particle B to M times the initial value of the particle size corresponding to the first center particle B, and M is greater than 1. The change in particle size corresponding to each first center particle B in conjunction with the relatively short particle lifecycle can be used to represent the effect of the flame spreading outward in the firework visual effect.

For example, N and M can be the same.

For example, the particle color in the center particle attribute corresponding to each first center particle B can be an arbitrary color, e.g., in some embodiments, the color represented by the initial value of the particle color of the center particle attribute corresponding to each first center particle B can be, for example, white. In order to improve the brightness of the center of the firework, the particle color corresponding to each first center particle B can be integrally brightened.

In some embodiments, the particle color corresponding to the first center particle B can be kept unchanged in the particle lifecycle of the first center particle B.

For example, the initial value of the particle transparency of the center particle attribute corresponding to each first center particle B can be an arbitrary value, e.g., in some examples, the initial value of the particle transparency of the center particle attribute corresponding to each first center particle B can be 1, namely, each first center particle B is completely non-transparent.

In some examples, the particle transparency corresponding to the first center particle B can be kept unchanged in the particle lifecycle of the first center particle B.

In one embodiment, the at least one center particle map group includes a first center particle map group, and the plurality of first center particles correspond to the first center particle map group. The first center particle map group includes a plurality of first center maps, for example, the plurality of first center maps can be different from each other.

For example, the generation method of the firework visual effect further includes: switching the plurality of first center maps according to a preset switching frequency for each first center particle in the particle lifecycle of each first center particle (the first center particle A or the second center particle B) to render each first center particle so as to obtain the center particle primitive model corresponding to each first center particle.

For example, the preset switching frequency can be Q2 times per second. For example, if the particle lifecycle of the first center particle is 1 second and the rendering frame rate is Q2 times/second, the first center particle will be rendered Q2 times in the particle lifecycle of the first center particle, and the first center map for rendering needs to be switched each time the first center particle is rendered. The specific value of Q2 can be selected according to the actual effect, and is not limited in the present disclosure.

It is to be noted that each center particle can be rendered at least once, and in each rendering, it is needed to update the center particle attribute value corresponding to the center particle, select the corresponding center map, and then, perform rendering based on the updated center particle attribute value and the selected center map.

For example, when rendering, the first center map can be selected from at least part of the plurality of first center maps in sequence according to a fixed order for rendering, or one first center map can be randomly selected from at least part of the plurality of first center maps for rendering.

For example, the plurality of first center maps include at least two first center maps different from each other, and the at least two first center maps are randomly switched according to the preset switching frequency for rendering any first center particle in the particle lifecycle of any first center particle.

Figure 2A:
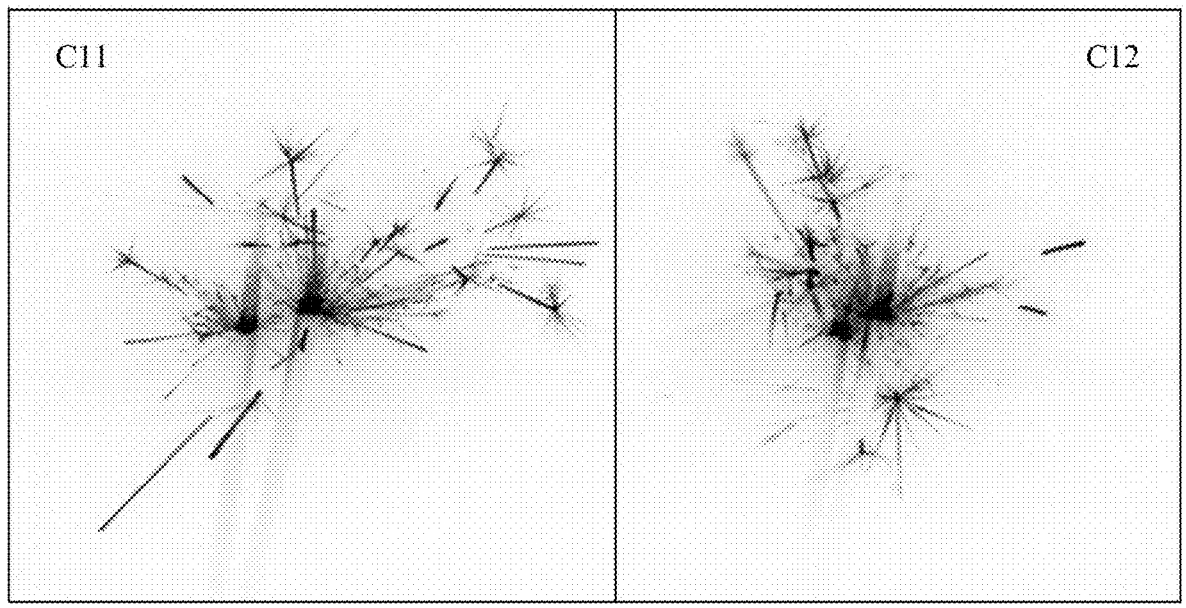
FIG. 2A is a schematic diagram of respective first center maps of a first group of first center maps provided by at least one embodiment of the present disclosure.

For example, the plurality of first center maps include a first group of first center maps corresponding to the first group of first center particles (i.e., the first center particle A), and FIG. 2A shows respective first center maps of the first group of first center maps. As shown in FIG. 2A, the first group of first center maps can include a first center map C11 and a first center map C12.

For example, for each first center particle A, in the initialization stage, one first center map is randomly selected from the respective first center maps included in the first group of first center maps for rendering and displaying, and then, the first center map for rendering the first center particle A is randomly or sequentially switched according to the preset switching frequency in the particle lifecycle of the first center particle A.

For example, in case of rendering a certain first center particle A multiple times using the first group of first center maps shown in FIG. 2A, in the first rendering, the first center map C11 on the left side is used for rendering; then, in the second rendering, if the map needs to be switched, the first center map C12 on the right side can be used for rendering; then, in the third rendering, if the map needs to be switched, the first center map C11 on the left side can be used for rendering; and then, in the fourth rendering, if the map needs to be switched, the first center map C12 on the right side can be used for rendering, and so on.

It is to be noted that the first group of first center maps is not limited to the case shown in FIG. 2A, and the first group of first center maps can include more first center maps.

Figure 2B:
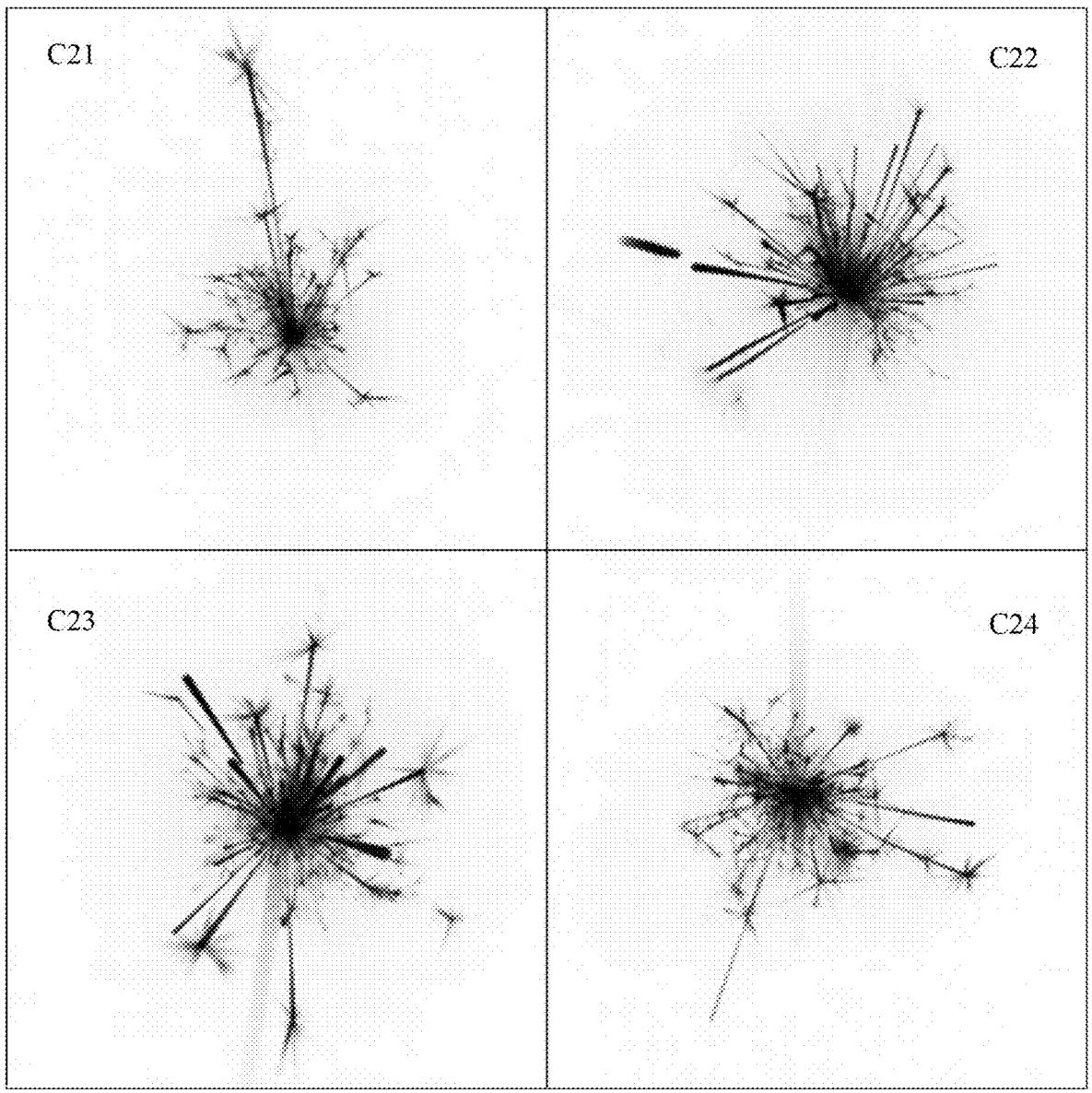
FIG. 2B is a schematic diagram of respective first center maps of a second group of first center maps provided by at least one embodiment of the present disclosure.

The plurality of first center maps further include a second group of first center maps corresponding to the second group of first center particles (i.e., the first center particle B), and the first center maps in the second group of first center maps can be different from the first center maps in the first group of first center maps. FIG. 2B shows respective first center maps of the second group of first center maps. As shown in FIG. 2B, the second group of first center maps can include a first center map C21, a first center map C22, a first center map C23, and a first center map C24.

For example, for each first center particle B, in the initialization stage, one first center map is randomly selected from all the first center maps included in the second group of first center maps for rendering and displaying, and then, the first center map for rendering the first center particle B is randomly or sequentially switched according to the preset switching frequency in the particle lifecycle of the first center particle B.

For example, in case of rendering a certain first center particle B multiple times using the second group of first center maps shown in FIG. 2B, in the first rendering, the first center map C21 is used for rendering; then, in the second rendering, if the map needs to be switched, the first center map C22 can be used for rendering; then, in the third rendering, if the map needs to be switched, the first center map C23 can be used for rendering; then, in the fourth rendering, if the map needs to be switched, the first center map C24 can be used for rendering; then, in the fifth rendering, if the map needs to be switched, the first center map C21 can be used for rendering; then, in the sixth rendering, if the map needs to be switched, the first center map C22 can be used for rendering; then, in the seventh rendering, if the map needs to be switched, the first center map C23 can be used for rendering; and then, in the eighth rendering, if the map needs to be switched, the first center map C24 can be used for rendering, and so on.

It is to be noted that the switching sequence, the preset switching frequency, and the like of the plurality of first center maps can be set according to actual conditions, and are not limited to the above description. For another example, in other embodiments, in case of rendering a certain first center particle B multiple times using the second group of first center maps shown in FIG. 2B, in the first rendering, the first center map C21 is used for rendering; then, in the second rendering, if the map needs to be switched, the first center map C23 can be used for rendering; then, in the third rendering, if the map needs to be switched, the first center map C22 can be used for rendering; then, in the fourth rendering, if the map needs to be switched, the first center map C24 can be used for rendering; then, in the fifth rendering, if the map needs to be switched, the first center map C21 can be used for rendering; then, in the sixth rendering, if the map needs to be switched, the first center map C23 can be used for rendering; then, in the seventh rendering, if the map needs to be switched, the first center map C22 can be used for rendering; and then, in the eighth rendering, if the map needs to be switched, the first center map C24 can be used for rendering, and so on. Or, the switching sequence can be a random sequence.

It is to be noted that the second group of first center maps is not limited to the case shown in FIG. 2B, and the second group of first center maps can include more or less first center maps.

For example, the plurality of center particles further include a plurality of second center particles. For example, the plurality of second center particles are mainly used for rendering the background color of the center part of the firework visual effect.

For example, the initial value of the particle size corresponding to each second center particle can be greater than or equal to the initial value of the particle size corresponding to each first center particle B. For example, the initial value of the particle size corresponding to each second center particle can be a random value in a third center size range, i.e., a value can be randomly selected from the third center size range to be set as the initial value of the particle size corresponding to any second center particle. The third center size range can be set according to the actual situation, and is not limited in the present disclosure.

For example, because the second center particles are used for rendering the background effect of the center part, the particle size corresponding to any second center particle can be kept unchanged in the particle lifecycle of the any second center particle of the plurality of second center particles.

For example, the particle color corresponding to each second center particle is different from the particle color corresponding to each first center particle. For example, the particle color in the center particle attribute corresponding to each second center particle can be an arbitrary color, for example, in some examples, the color represented by the initial value of the particle color of the center particle attribute corresponding to each second center particle can be, for example, gray.

For example, in some examples, the particle color corresponding to each second center particle can be kept unchanged in the particle lifecycle of each second center particle.

For example, the second center particles are mainly used for rendering the background color of the center part of the firework visual effect, therefore, the brightness of the particle color corresponding to the second center particle can be dimmed, and the value of the transparency is decreased, that is, the value of the particle transparency corresponding to each second center particle is smaller than the value of the particle transparency corresponding to each first center particle, and the brightness corresponding to each second center particle is lower than the brightness corresponding to each first center particle.

For example, the value of the particle transparency corresponding to each second center particle is smaller than the value of the particle transparency corresponding to each first center particle. For example, the initial value of the particle transparency of the center particle attribute corresponding to each second center particle can be an arbitrary value as long as the initial value of the particle transparency of the center particle attribute corresponding to the second center particle is smaller than the initial value of the particle transparency corresponding to the first center particle.

For example, in some examples, the particle transparency corresponding to each second center particle can be kept unchanged in the particle lifecycle of each second center particle.

Figure 2C:
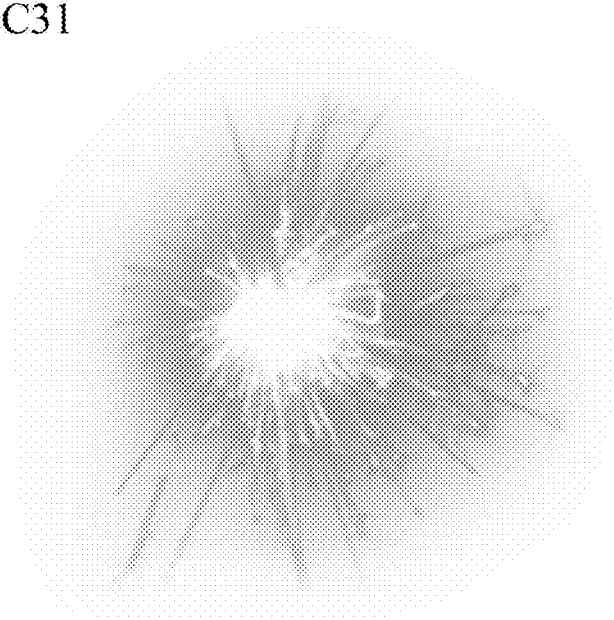
FIG. 2C is a schematic diagram of a second center map provided by at least one embodiment of the present disclosure.

For example, the at least one center particle map group further includes a second center particle map group, and the plurality of second center particles correspond to the second center particle map group. The second center particle map group can include a plurality of second center maps that are different from each other. For example, FIG. 2C shows the second center maps, and in some examples, as shown in FIG. 2C, the plurality of second center maps can include a second center map C31.

For example, the second center particles and the first center particles are basically consistent, and the main difference is that in the rendering process, the maps corresponding to the second center particles are different from the maps corresponding to the first center particles; besides, in the particle lifecycle of each second center particle, the map used for rendering the second center particle does not need to be switched, that is, the second center map used for rendering the second center particle is kept unchanged in the particle lifecycle of the second center particle. However, the present disclosure is not limited thereto, in the particle lifecycle of any second center particle, the plurality of second center maps can be randomly or sequentially switched according to the preset switching frequency for rendering the visual effect of any second center particle.

For example, the spark particle set includes a plurality of spark particles. In the step S10, the generating the spark particle set includes: generating the plurality of spark particles, and setting an attribute value of a corresponding spark particle attribute for each spark particle to obtain a plurality of spark particle attribute values.

For example, the plurality of spark particle attribute values are in one-to-one correspondence to the plurality of spark particles, namely, each spark particle has a corresponding spark particle attribute value.

For example, the spark particle attribute corresponding to each spark particle has various attribute data. These attribute data will affect the overall rendering effect of each spark particle, for example, the spark particle attribute includes any combination of the following attributes: particle lifecycle, particle size, particle color, particle transparency, particle mass, particle orientation, particle position, particle speed, particle rotation angle, and the like. The spark particle attribute corresponding to the spark particle can be reflected on the corresponding spark particle primitive model obtained by rendering the spark particle.

For example, when generating each spark particle, an initial attribute value can be set for the spark particle attribute corresponding to the spark particle, and the initial attribute value can include the initial value of the particle size corresponding to the spark particle, the initial value of the particle color corresponding to the spark particle, the initial value of the particle transparency corresponding to the spark particle, the initial value of the particle mass corresponding to the spark particle, the initial value of the particle orientation corresponding to the spark particle, the initial value of the particle position corresponding to the spark particle, the initial value of the particle speed corresponding to the spark particle, the initial value of the particle rotation angle corresponding to the spark particle, and the like.

For example, in some embodiments, the initial generation positions of all the particles in the spark particle set are the same, e.g., the initial generation positions are at the origin of the virtual three-dimensional coordinate system; or, in other embodiments, the initial generation positions of all the particles in the spark particle set are in a second three-dimensional region including the origin of the virtual three-dimensional coordinate system, that is, the initial generation position corresponding to each spark particle can be set to any position in the second three-dimensional region, such as the center of the second three-dimensional region.

For example, the center of the second three-dimensional region can be the origin of the virtual three-dimensional coordinate system.

For example, the second three-dimensional region can be a spherical region, a cube region, and the like. The size of the second three-dimensional region does not exceed the size threshold, the size threshold can be set according to specific circumstances, and the present disclosure does not limit this.

It is to be noted that the present disclosure is not limited to the above-described conditions, and in some embodiments, the initial generation position corresponding to each particle in the spark particle set can be in any three-dimensional region in the three-dimensional space, the size of the any three-dimensional region does not exceed the size threshold.

Because the sparks of the firework have a fluttering process, the particle lifecycle of each spark particle is longer than that of each center particle. For example, the particle lifecycle in each spark particle attribute can be in a second lifecycle range, which can be set according to the actual conditions, and the present disclosure does not limit the second lifecycle range.

In order to simulate the effect of spark disappearance, in the particle lifecycle of the spark particle, the spark particle primitive model corresponding to the spark particle will gradually become smaller and eventually shrink to invisible, and the transparency of the spark particle primitive model corresponding to the spark particle gradually becomes higher and the spark particle primitive model eventually become completely transparent.

It should be noted that in the present disclosure, the higher the transparency of the particle primitive model is, the more transparent the particle primitive model is, that is, the more the value of the particle transparency corresponding to the particle primitive model tends to 0; on the contrary, the lower the transparency of the particle primitive model is, the more non-transparent the particle primitive model is, that is, the more the value of the particle transparency corresponding to the particle primitive model tends to 1.

For example, in the particle lifecycle of any spark particle, the particle size corresponding to any spark particle will change continuously, for example, the particle size corresponding to any spark particle decreases gradually from the initial value of the particle size corresponding to any spark particle to 0.

For example, in the particle lifecycle of any spark particle, the particle transparency corresponding to each spark particle will change continuously, the particle transparency corresponding to any spark particle gradually changes from the transparency represented by the initial value of the particle transparency corresponding to any spark particle to complete transparency, i.e., if the transparency represented by the initial value of the particle transparency corresponding to any spark particle is complete non-transparency, the particle transparency corresponding to any first spark particle gradually changes from complete non-transparency to complete transparency, that is, the value of the particle transparency corresponding to the first spark particle gradually changes from 1 to 0.

Because the spark particle set is mainly used for representing the effect of spark debris flying outwards in the firework visual effect, namely, each spark particle in the spark particle set has a certain particle speed, and in the particle lifecycle of each spark particle, the spark particle can move in the direction away from the center particle relative to the corresponding center particle. For example, in the initialization stage, the initial value (not 0) of the particle speed can be randomly set for each spark particle, the initial value of the particle speed is a random value within a preset speed range, and the direction of the particle speed is an arbitrarily direction away from the center part of the firework visual effect. The preset speed range can be set according to actual conditions, and the present disclosure does not limit this. For example, the direction of the particle speed corresponding to each spark particle can be randomly set.

For the spark particles in the spark particle set, in order to simulate the real trajectory of splashing spark, the calculation influence of gravity and drag can be added when updating the spark particle attribute values of the spark particles, for example, each spark particle attribute further includes a gravity attribute and a drag attribute. The gravity attribute and the drag attribute can be simulated and calculated based on the principle of physics.

For example, in the particle lifecycle of any spark particle of the plurality of spark particles, the motion speed and the motion trajectory of any spark particle are related to gravity and drag. In the particle lifecycle of the spark particle, the particle speed corresponding to the spark particle changes continuously and the specific value of the particle speed is related to factors such as gravity and drag. The gravity and drag can be simulated and determined based on certain conditions.

For example, in some embodiments, the step S12 can include: respectively rendering the plurality of spark particles based on the plurality of spark particle attribute values to obtain the spark particle primitive model set.

For example, the spark particle set corresponds to at least one spark particle map group.

For example, in the step S12, the respectively rendering the plurality of spark particles based on the plurality of spark particle attribute values to obtain the spark particle primitive model set includes: for each spark particle, obtaining a corresponding spark particle map group, and rendering each spark particle based on the corresponding spark particle map group and the corresponding spark particle attribute value to obtain the spark particle primitive model corresponding to each spark particle.

For example, the spark particle primitive model set includes a plurality of spark particle primitive models corresponding to the plurality of spark particles, respectively.

For example, in each rendering process of each spark particle, firstly, the state of the spark particle attribute of the spark particle at the rendering moment is determined, and the spark particle attribute value corresponding to the spark particle is updated based on the state of the spark particle attribute to obtain the updated spark particle attribute value; then, the spark particle map group corresponding to the spark particle is obtained; and then, the spark particle is rendered based on the corresponding spark particle map group and the updated spark particle attribute value so as to obtain the spark particle primitive model corresponding to the spark particle.

For example, in the particle lifecycle of each spark particle, the spark particle attribute value corresponding to the spark particle is updated according to the rendering frame rate, and the spark particle is rendered based on the updated spark particle attribute value and the corresponding spark particle map group to obtain the spark particle primitive model corresponding to the spark particle, so that the change of the spark particle primitive model with time can be simulated.

For example, in the rendering process, the spark map corresponding to each spark particle is always oriented toward the virtual camera, namely, the position and direction of the lens of the virtual camera. Each spark particle of the plurality of spark particles can be rendered multiple times, and in each rendering process for rendering the spark particle, the spark map, which is adopted, in the corresponding spark map group has a random rotation angle, in a plane facing the virtual camera adopted for rendering, around the normal of the plane. For example, the particle rotation angle in each spark particle attribute is used to represent the random rotation angle described above. For example, when generating a spark particle, an angle can be randomly selected from 0 degree to 360 degrees to be set as the initial value of the particle rotation angle in the spark particle attribute corresponding to the spark particle.

In the present disclosure, the rendering mode of the spark particle set is a patch model, namely, each spark particle is rendered in a form of the patch model in combination with a specific material. Therefore, each spark particle primitive model can be the patch model, such as a triangular patch model.

For example, the plurality of spark particles include a plurality of first spark particles, a plurality of second spark particles, and a plurality of third spark particles. In the step S10, the generating the plurality of spark particles includes: generating the plurality of first spark particles and the plurality of third spark particles at a second generation rate; and generating the plurality of second spark particles at a third generation rate.

In one embodiment, the third generation rate is greater than the second generation rate.

For example, the second generation rate represents a rate at which the first spark particles and the third spark particles are generated, and the third generation rate represents a rate at which the second spark particles are generated. For example, the second generation rate can be that Q3 first spark particles/third spark particles are generated per second. For example, generating the Q3 first spark particles/third spark particles per second represents generating one first spark particle/third spark particle every 1/(Q3) second. The third generation rate can be that Q4 second spark particles are generated per second. For example, generating the Q4 second spark particles per second represents generating one second spark particle every 1/(Q4) second. Q3 is less than Q4, and the specific values of Q3 and Q4 can be selected according to the actual effect and are not limited in the present disclosure.

For example, the plurality of first spark particles includes a first group of first spark particles (the first spark particles in the first group of first spark particles are described as first spark particles C hereinafter) and a second group of first spark particles (the first spark particles in the second group of first spark particles are described as first spark particles D hereinafter). The first spark particles C and the first spark particles D are basically consistent, and the main difference is that: in the rendering process, the maps corresponding to the first spark particles C are different from the maps corresponding to the first spark particles D. The related attribute information of the first spark particle C and the second spark particle D is described below.

For example, the initial value of the particle size in the spark particle attribute corresponding to each first spark particle C is a random value in a first spark size range, that is, a value can be randomly selected from the first spark size range to be set as the initial value of the particle size corresponding to any first spark particle C. The first spark size range can be set according to actual conditions, and the present disclosure does not limit the first spark size range.

For example, the initial value of the particle transparency of the spark particle attribute corresponding to each first spark particle C can be an arbitrary value, for example, in some examples, the initial value of the particle transparency of the spark particle attribute corresponding to each first spark particle C can be 1.

For example, the particle color of the spark particle attribute corresponding to each first spark particle C can be an arbitrary color, for example, in some examples, the color represented by the initial value of the particle color of the spark particle attribute corresponding to each first spark particle C can be, for example, white. In order to improve the brightness of the spark part in the firework visual effect, the particle color corresponding to each first spark particle C can be integrally brightened, e.g., the initial value of the particle color can be brightened by 10 to 40 times.

For example, in some examples, the particle color corresponding to the first spark particle C can be kept unchanged in the particle lifecycle of the first spark particle C, but the present disclosure is not limited thereto, and the particle color of any first spark particle C can also change in the particle lifecycle of any first spark particle C.

For example, in some embodiments, the initial value of the particle speed of the spark particle attribute corresponding to each first spark particle C can be set to be an arbitrary value in the preset speed range according to the actual situation.

In one embodiment, the initial value of the particle size in the spark particle attribute corresponding to each first spark particle D can be a random value in a second spark size range, that is, a value can be randomly selected from the second spark size range to be set as the initial value of the particle size corresponding to any first spark particle D. The second spark size range can be set according to actual situation, and the present disclosure does not limit this.

For example, the initial value of the particle transparency of the spark particle attribute corresponding to each first spark particle D can be an arbitrary value, for example, in some examples, the initial value of the particle transparency of the spark particle attribute corresponding to each first spark particle D can be 1.

For example, the particle color of the spark particle attribute corresponding to each first spark particle D can be an arbitrary color, for example, in some examples, the color represented by the initial value of the particle color of the spark particle attribute corresponding to each first spark particle D can be, for example, white. In order to improve the brightness of the spark part in the firework visual effect, the particle color corresponding to each first spark particle D can be integrally brightened, for example, the initial value of the particle color can be brightened by 2 to 20 times.

For example, the particle color of any first spark particle D can kept unchanged in the particle lifecycle of any first spark particle D, but the present disclosure is not limited thereto, and the particle color of any first spark particle D can also change in the particle lifecycle of any first spark particle D.

For example, in some embodiments, the initial value of the particle speed of the spark particle attribute corresponding to each first spark particle D can be set to be an arbitrary value in the preset speed range according to the actual conditions.

For the spark particle set, the spark map for rendering each spark particle can remain unchanged in the particle lifecycle of the spark particle. The present invention is not limited thereto, in the particle lifecycle of each spark particle, a plurality of spark maps can also be randomly or sequentially switched according to a preset switching frequency for rendering the visual effect of the spark particle.

For example, the at least one spark particle map group includes a first spark particle map group, and the plurality of first spark particles correspond to the first spark particle map group. The first spark particle map group can include a plurality of first spark maps for rendering the plurality of first spark particles.

Figure 3A:
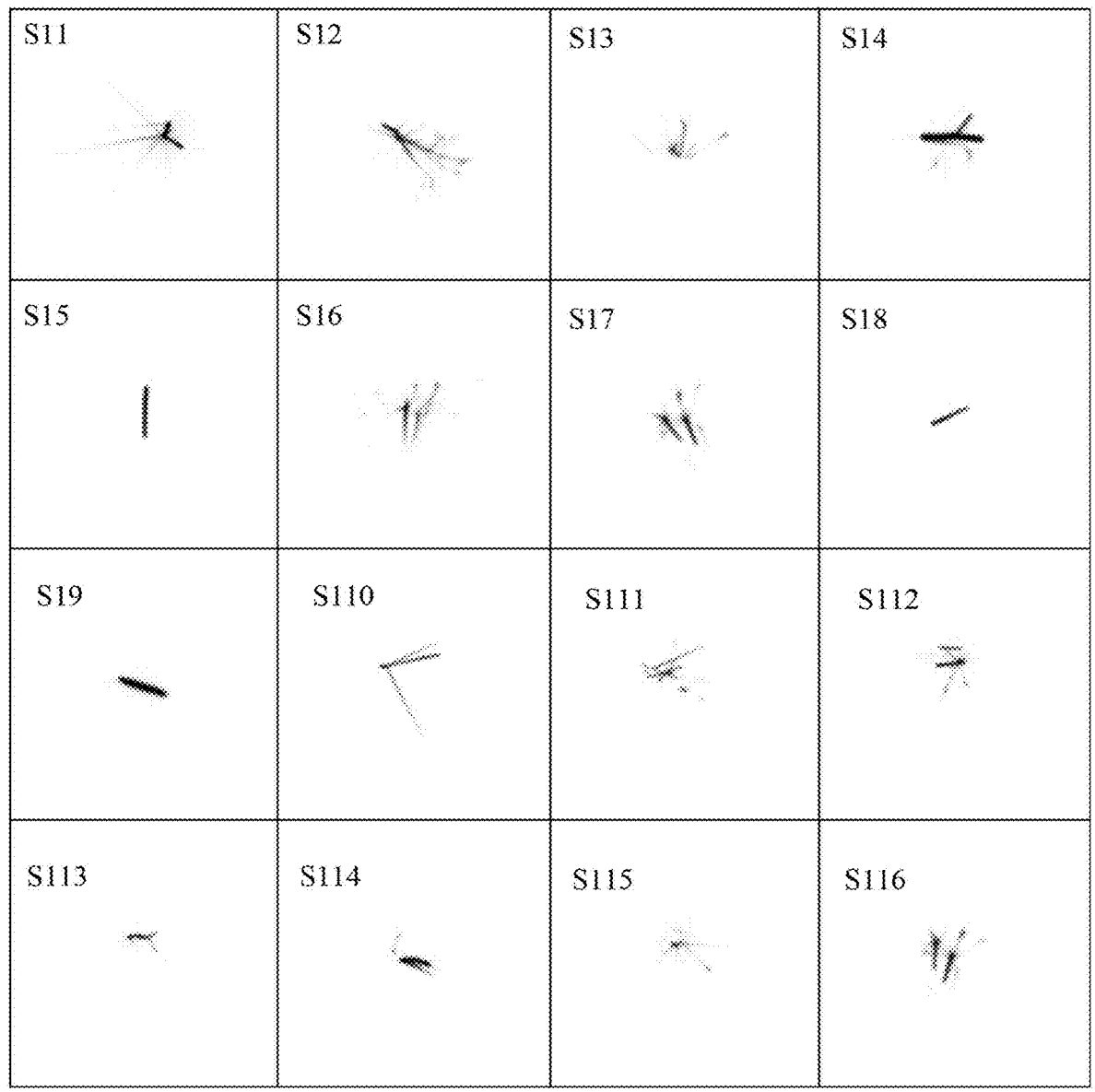
FIG. 3A is a schematic diagram of respective first spark maps of a first group of first spark maps provided by at least one embodiment of the present disclosure.

For example, the plurality of first spark maps include a first group of first spark maps corresponding to the first group of first spark particles (i.e., the first spark particles C), and FIG. 3A shows respective first spark maps of the first group of first spark maps. As shown in FIG. 3A, the first group of first spark maps can include first spark maps S11 to S16. In case of rendering any one of the first spark particles C, one first spark map can be randomly selected from the first group of first spark maps for rendering.

It is to be noted that the first group of first spark maps is not limited to the case shown in FIG. 3A, and the first group of first spark maps can include more or less first spark maps.

Figure 3B:
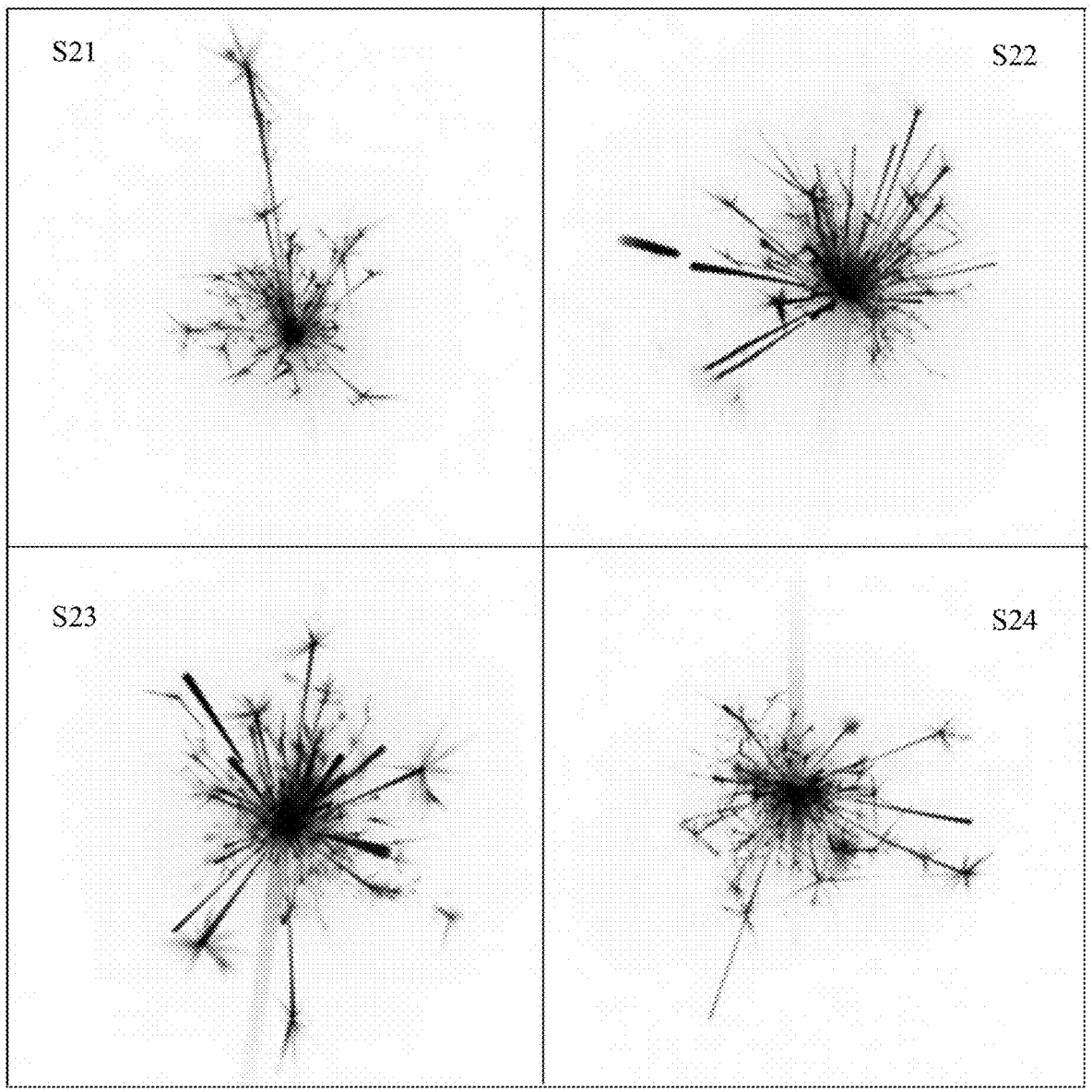
FIG. 3B is a schematic diagram of respective first spark maps of a second group of first spark maps provided by at least one embodiment of the present disclosure.

For example, the plurality of first spark maps further include a second group of first spark maps corresponding to the second group of first spark particles (i.e., the first spark particles D), and the first spark maps in the second group of first spark maps can be different from the first spark maps in the first group of first spark maps. FIG. 3B shows respective first spark maps of the second group of first spark maps. As shown in FIG. 3B, the second group of first spark maps can include a first spark map S21, a first spark map S22, a first spark map S23, and a first spark map S24. In case of rendering any one of the first spark particles D, one first spark map can be randomly selected from the second group of first spark maps for rendering.

It is to be noted that the second group of first spark maps is not limited to the case shown in FIG. 3B, and the second group of first spark maps can include more or less first spark maps.

For example, in some embodiments, as shown in FIG. 2B and FIG. 3B, the respective first center maps in the second group of first center maps and the respective first spark maps in the second group of first spark maps can be the same, e.g., the first center map C21 and the first spark map S21 are the same.

In one embodiment, the initial value of the particle size in the spark particle attribute corresponding to each second spark particle is a random value in a third spark size range, that is, at least one value can be randomly selected from the third spark size range to be set as the initial value of the particle size corresponding to any second spark particle. The third spark size range can be set according to actual conditions, and the present disclosure does not limit the third spark size range.

For example, the second spark particles are used for representing strip-shaped sparks in the firework visual effect, so that the particle primitive model corresponding to the second spark particle can be rectangular, that is, the particle size corresponding to the second spark particle includes a length and a width, and the length is greater than the width.

For example, the initial value of the particle transparency of the spark particle attribute corresponding to each second spark particle can be an arbitrary value, e.g., in some examples, the initial value of the particle transparency of the spark particle attribute corresponding to each second spark particle can be 1. It is to be noted that in the particle lifecycle of any second spark particle, the particle transparency corresponding to each second spark particle can gradually become complete transparency or can remain unchanged.

For example, the particle color of the spark particle attribute corresponding to each second spark particle can be an arbitrary color, e.g., in some examples, the color represented by the initial value of the particle color of the spark particle attribute corresponding to each second spark particle can be, for example, white. In order to improve the brightness of the spark part in the firework visual effect, the particle color corresponding to each second spark particle can be integrally brightened, for example, the initial value of the particle color can be brightened by 1 to 10 times.

In order to increase the color change effect in the flying process of spark debris, the particle color corresponding to each second spark particle changes in the particle lifecycle of each second spark particle. For example, the color indicated by the initial value of the particle color in the spark particle attribute corresponding to any second spark particle is a first initial color, the particle color corresponding to any second spark particle changes from the first initial color to a first intermediate color and then to a first final color in the particle lifecycle of any second spark particle, the first initial color, the first intermediate color, and the first final color are different from each other, for example, in some examples, the first initial color can be white, the first intermediate color can be yellow, and the first final color can be purplish red, in this case, the spark particle primitive model corresponding to the second spark particle can continuously change from white to yellow and then to purplish red in the particle lifecycle of the second spark particle. However, the present disclosure is not limited to this case, the particle color corresponding to any second spark particle can also remain unchanged in the particle lifecycle of any second spark particle.

For example, in some embodiments, the initial value of the particle speed of the spark particle attribute corresponding to each second spark particle can be set to be an arbitrary value within the preset speed range according to the actual situation.

Figure 3C:
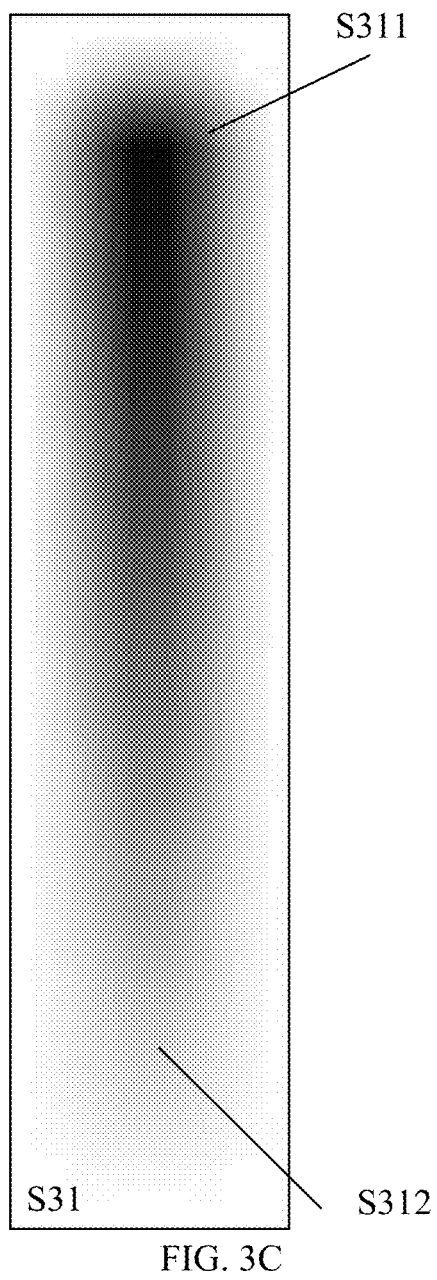
FIG. 3C is a schematic diagram of a second spark map provided by at least one embodiment of the present disclosure.

In one embodiment, the at least one spark particle map group further includes a second spark particle map group, the second spark particle map group is a trailing spark map group, and the plurality of second spark particles correspond to the trailing spark map group. The trailing spark map group can include at least one trailing spark map (hereinafter referred to as a second spark map, for example, the map includes a strip-shaped spark map with a trailing effect) for rendering the plurality of second spark particles. FIG. 3C shows a second spark map. As shown in FIG. 3C, the plurality of second spark maps can include the second spark map S31. In case of rendering any second spark particle, one second spark map can be randomly selected from the plurality of second spark maps for rendering.

For example, each second spark particle can be rendered multiple times, and in each process for rendering the second spark particle, the rotation direction of the corresponding trailing spark map, which is adopted, is adjusted based on the motion direction of the second spark particle, so that the trailing direction of the corresponding trailing spark map is opposite to the motion direction of the second spark particle.

For example, the basic design effect of the second spark particle is similar to that of the first spark particle, the second spark particles are mainly used for adding a spark debris form to the firework visual effect, and the second spark particles are mainly used for representing long-strip-shaped sparks with some trailing effects, and therefore, the map shown in FIG. 3C can be used. In order to represent the "trailing" effect, for the second spark particle, the map shown in the FIG. 3C is used for rendering to obtain the corresponding spark particle primitive model, and in the flying process, the orientation of the spark particle primitive model corresponding to the second spark particle can always be adjusted with the current motion direction of the spark particle primitive model. For example, the trailing direction (namely the direction from a head S311 to a tail S312) corresponding to the second spark map is opposite to the motion direction of the corresponding spark particle primitive model, that is, the direction from the tail S312 to the head S311 of the second spark map shown in FIG. 3C is the motion direction of the spark particle primitive model.

It is to be noted that the second spark map is not limited to the case shown in FIG. 3C, and in the embodiment of the present disclosure, the second spark particle map group can include a plurality of different second spark maps that can represent the trailing effect.

In one embodiment, the initial value of the particle size in the spark particle attribute corresponding to each third spark particle is a random value in a fourth spark size range, that is, at least one value can be randomly selected from the fourth spark size range to be set as the initial value of the particle size corresponding to any third spark particle. The fourth spark size range can be set according to the actual conditions, and the present disclosure does not limit the fourth spark size range. For example, the primitive model corresponding to the third spark particle can be rectangular, that is, the particle size corresponding to the third spark particle includes a length and a width, for example, in the initialization stage, a value can be randomly selected from the fourth spark size range and is set as the initial value of the length of the particle size corresponding to any third spark particle, and a value can be randomly selected from the fourth spark size range and is set as the initial value of the width of the particle size corresponding to any third spark particle.

For example, the initial value of the particle transparency of the spark particle attribute corresponding to each third spark particle can be an arbitrary value, for example, in some examples, the initial value of the particle transparency corresponding to each third spark particle can be 1.

For example, the particle color of the spark particle attribute corresponding to each third spark particle can be an arbitrary color, e.g., in some examples, the color indicated by the initial value of the particle color of the spark particle attribute corresponding to each third spark particle can be, for example, white. In order to improve the brightness of the spark part in the firework visual effect, the particle color corresponding to each third spark particle can be integrally brightened, for example, brightened by 1 to 10 times.

For example, the particle color corresponding to any third spark particle can change in the particle lifecycle of any third spark particle, for example, the color indicated by the initial value of the particle color in the spark particle attribute corresponding to any third spark particle is a second initial color, the particle color corresponding to any third spark particle changes from the second initial color to a second intermediate color and then to a second final color in the particle lifecycle of any third spark particle, the second initial color, the second intermediate color, and the second final color are different from each other, for example, in some examples, the second initial color can be orange, the second intermediate color can be red, and the second final color can be purple, in this case, the spark particle primitive model corresponding to the third spark particle can continuously change from orange to red and then to purple in the particle lifecycle of the third spark particle. However, the present disclosure is not limited thereto, the particle color corresponding to any third spark particle can also be kept unchanged in the particle lifecycle of any third spark particle.

For example, in some embodiments, the initial value of the particle speed of the spark particle attribute corresponding to each third spark particle can be set to an arbitrary value in the preset speed range according to the actual situation.

For example, a dynamic rotation effect can be set in the particle lifecycle of any third spark particle, that is, in the particle lifecycle of any third spark particle, the spark particle primitive model corresponding to the third spark particle can be continuously rotated, for example, the particle rotation angle corresponding to any third spark particle changes from an initial rotation angle to a final rotation angle, a difference between the initial rotation angle and the final rotation angle is at an angle threshold, for example, in some examples, the angle threshold can be in a range of 5~20 degrees. For example, the initial rotation angle can be an angle represented by the initial value of the particle rotation angle in the spark particle attribute corresponding to any third spark particle.

Figure 3D:
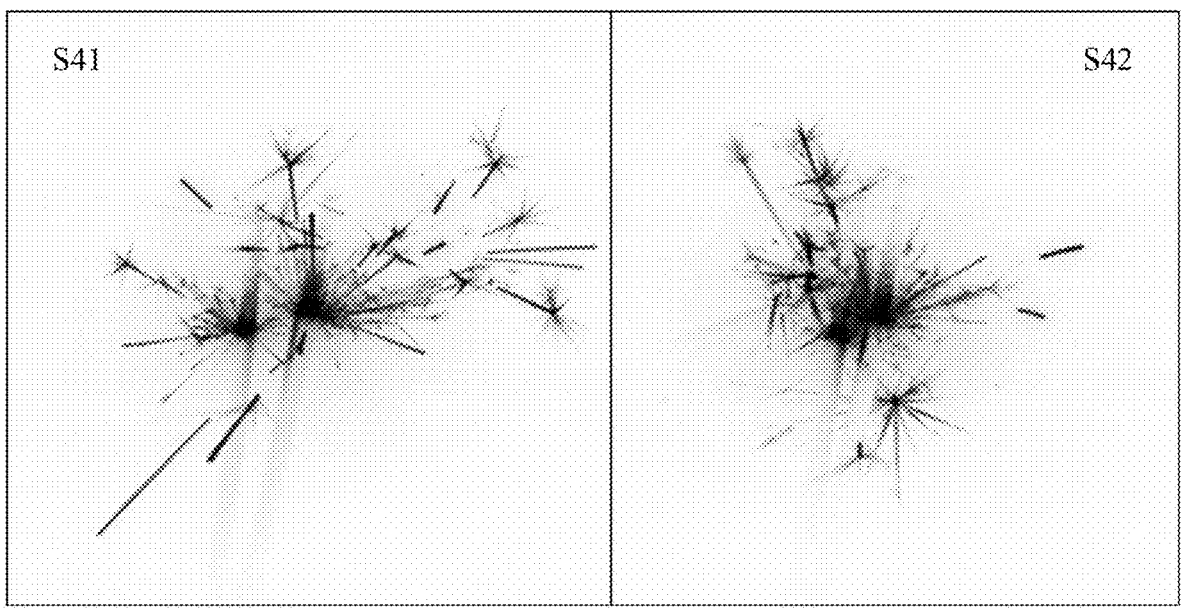
FIG. 3D is a schematic diagram of a third spark map provided by at least one embodiment of the present disclosure.

For example, the at least one spark particle map group can further include a third spark particle map group, and the plurality of third spark particles correspond to the third spark particle map group. The third spark particle map group can include a plurality of third spark maps for rendering the plurality of third spark particles. FIG. 3D shows the plurality of third spark maps. As shown in FIG. 3D, the plurality of third spark maps can include a third spark map S41 and a third spark map S42. In case of rendering any third spark particle, one third spark map can be randomly selected from the plurality of third spark maps for rendering.

It is to be noted that the plurality of third spark maps are not limited to the case shown in FIG. 3A, the embodiments of the present disclosure can include more or less third spark maps.

For example, in some embodiments, as shown in FIG. 2A and FIG. 3D, the respective first center maps in the first group of first center maps and the plurality of third spark maps can be the same, for example, the first center map C11 and the third spark map S41 are the same, and the first center map C12 and the third spark map S42 are the same.

For example, the size of each center map in the at least one center particle map group and the size of each spark map in the at least one spark particle map group can be set according to actual conditions, for example, the size of each center map and the size of each spark map both can be $2^n * 2^n$ (pixels), n is a positive integer, for example, 512*512 (n is 9), and 1024*1024 (n is 10).

It is to be noted that in the present disclosure, the particle size represents the size of the particle primitive model corresponding to the particle in the virtual three-dimensional space, and the particle size being 1 can be interpreted as the size of "1 m*1 m" in the virtual three-dimensional space. The value of the center particle attribute of each center particle in the center particle set can be set according to the actual application requirements, and the value of the spark particle attribute of each spark particle in the spark particle set can be set according to the actual application requirements, and the present disclosure is not specifically limited in this regard. Those skilled in the art should understand that in the present disclosure, "meter (m)" is the unit of the dimension in the three-dimensional space defined by the virtual three-dimensional coordinate system.

In one embodiment, the step S13 can include: determining at least one center particle primitive model in the center particle primitive models set, the at least one center particle primitive model corresponding to each other; determining at least one spark particle primitive model corresponding to the at least one center particle primitive model; and superimposing the center of the at least one center particle primitive model and the center of the at least one spark particle primitive model to generate a sub-visual effect of the firework visual effect.

For example, in the case that the center of the at least one center particle primitive model and the center of the at least one spark particle primitive model are superimposed, the pixel of the at least one center particle primitive model and the pixel of the at least one spark particle primitive model at the same position are superimposed to generate the sub-visual effect of the firework visual effect.

For example, in some examples, the firework visual effect includes a plurality of sub-visual effects, each sub-visual effect can be formed by superimposing the center particle primitive model corresponding to the first center particle A, the center particle primitive model corresponding to the first center particle B, the center particle primitive model corresponding to the second center particle, the spark particle primitive model corresponding to the first spark particle C, the spark particle primitive model corresponding to the first spark particle D, the spark particle primitive model corresponding to the second spark particle, and the spark particle primitive model corresponding to the third spark particle.

The firework visual effect can be composed of a plurality of sub-visual effects. For example, in some embodiments, the center positions of the plurality of sub-visual effects are the same, in this case, the plurality of sub-visual effects can be superimposed to form the firework visual effect. For example, in other embodiments, the center positions of the plurality of sub-visual effects are different from each other, in this case, the firework visual effect is composed of the plurality of sub-visual effects located at different positions.

Figure 4A:
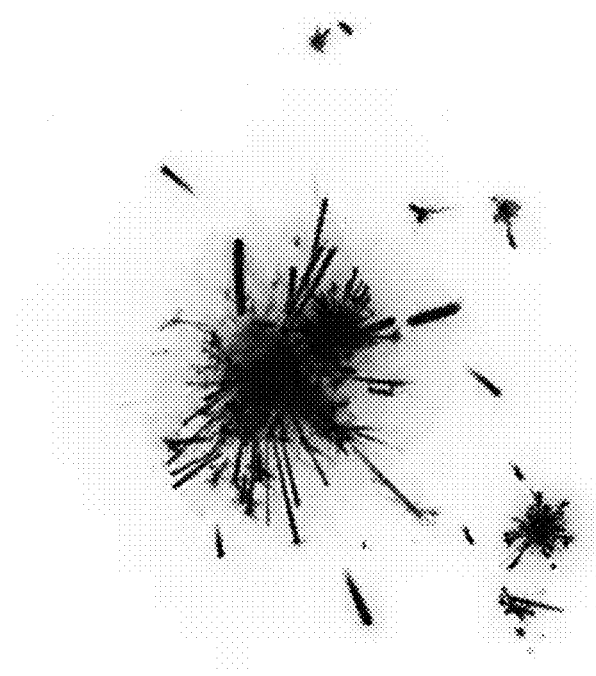
FIG. 4A is a schematic diagram of a sub-visual effect provided by some embodiments of the present disclosure.
Figures 4B, 5:
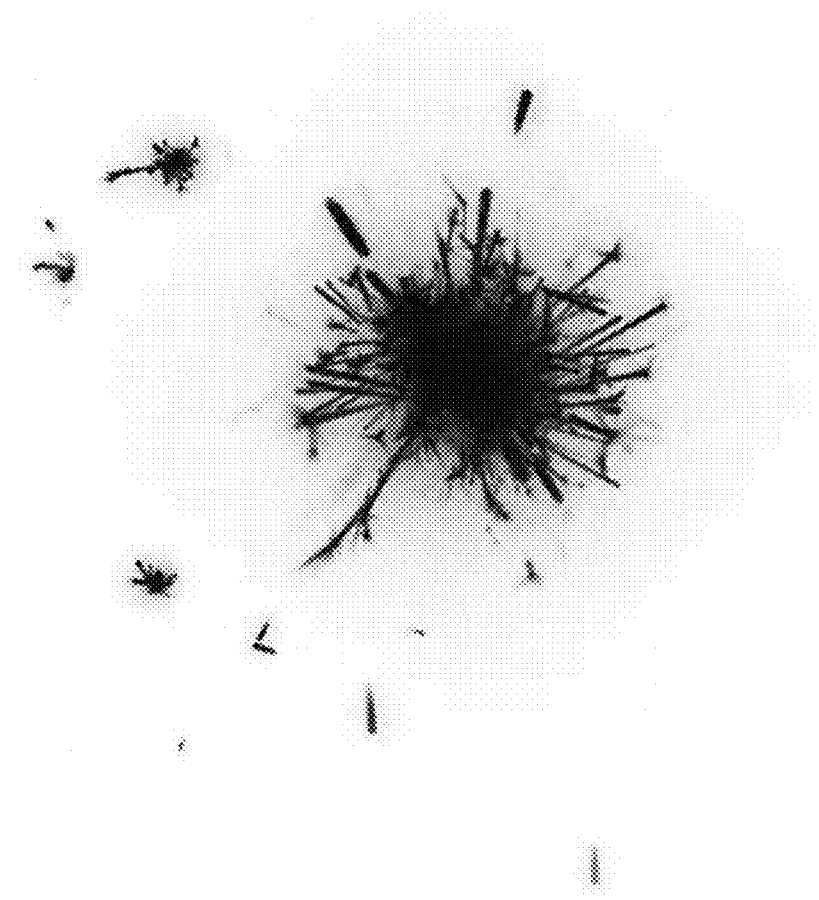
FIG. 4B is a schematic diagram of another sub-visual effect provided by some embodiments of the present disclosure.
FIG. 5 is a schematic flowchart of a video generation method provided by some embodiments of the present disclosure.

The plurality of sub-visual effects can be different from each other, for example, FIG. 4A and FIG. 4B show schematic diagrams of two sub-visual effects in the firework visual effect, and the two sub-visual effects shown in FIG. 4A and FIG. 4B are different from each other. For example, when rendering, the map (center map/spark map) used for rendering the sub-visual effect shown in FIG. 4A and the map (center map/spark map) used for rendering the sub-visual effect shown in FIG. 4B can be different from each other, so that the two sub-visual effects respectively shown in FIG. 4A and FIG. 4B are different from each other. Alternatively, in other embodiments, the map (center map/spark map) used for rendering the sub-visual effect shown in FIG. 4A and the map (center map/spark map) used for rendering the sub-visual effect shown in FIG. 4B can be the same, but the attribute values of the attributes of the respective particles (center particle/spark particle) are different, so as to obtain different sub-visual effects.

The time moments for generating the plurality of sub-visual effects are different.

It is to be noted that "at least one center particle primitive model corresponds to each other" can represent that the generation time of at least one center particle corresponding to the at least one center particle primitive model is the same or within a certain time range. "At least one spark particle primitive model corresponding to the at least one center particle primitive model" can represent that the generation time of at least one spark particle corresponding to the at least one spark particle primitive model and the generation time of the at least one center particle corresponding to the at least one center particle primitive model are the same or within a certain time range. For example, one first center particle A, one first center particle B, one second center particle, one first spark particle C, one first spark particle D, one second spark particle, and one third spark particle generated at the same time can correspond to one another.

For example, the firework visual effect represents the visual effect formed by superimposing the visual effects corresponding to respective center particle primitive models and the visual effects corresponding to respective spark particle primitive models.

Some embodiments of the present disclosure further provide a video generation method. FIG. 5 is a schematic flowchart of a video generation method provided by some embodiments of the present disclosure.

For example, as shown in FIG. 5, the video generation method comprises the following steps.

Step S20: determining a target position in a to-be-processed video.

Step S21: displaying a firework visual effect at the target position.

Step S22: generating a video with the firework visual effect superimposed.

For example, in the step S21, the firework visual effect can be generated according to the generation method for generating the firework visual effect according to any embodiment of the present disclosure.

In the video generation method provided by the embodiment of the present disclosure, the generated firework visual effect can be superimposed on the to-be-processed video, for example, the generated firework visual effect can be superimposed at the target position in the to-be-processed video, thus the firework visual effect can be achieved on different to-be-processed videos, and the application requirements of various scenes are met. For example, in case of being conjunction with the AR (e.g., AR placement) technology, an effect of a fingertip firework can be achieved.

For example, the to-be-processed video can be a video shot in real time or a video shot and stored in advance, and the to-be-processed video can be a video or a picture stored in the electronic device or a video or a picture shot by the user in real time. In this case, if the firework visual effect is implemented by the electronic device itself, the electronic device can process the to-be-processed video in real time, and if the firework visual effect is implemented by the server, the video stored in the electronic device or the video shot in real time is uploaded to the server via the network, and the server performs the firework visual effect process on the video and then returns the processed video to the electronic device. The user can upload the generated video to the server by the electronic device through network, and transmit the video to other users through social application or publish the video to the public.

For example, the user can click a video shooting button on the display screen to start shooting the to-be-processed video in real time. For example, a video shooting event can also be controlled by voice. According to different structures of different electronic devices, the user can trigger the video shooting event through a physical button, a displayed touch button, voice control, and other modes. The present disclosure does not limit the triggering condition for shooting.

In some embodiments, the step S20 can include: in response to detecting a target object in the to-be-processed video, identifying a feature point on the target object as the target position, or determining a visual effect trajectory in the to-be-processed video and selecting any trajectory point on the visual effect trajectory as the target position.

For example, the visual effect trajectory comprises a moving trajectory of the feature point on the target object.

For example, in other embodiments, the visual effect trajectory can be a predetermined trajectory, such as a heart-shaped trajectory, and a trajectory for forming a specific character, number, a specific graph, and the like.

For example, each trajectory point on the visual effect trajectory can be sequentially selected as the target position according to the generation time of the visual effect trajectory, so that the firework visual effect can be sequentially displayed on the visual effect trajectory according to the time, and thus the firework visual effect can move along the predetermined visual effect trajectory in the video. If the visual effect trajectory is determined by the movement of the finger, it can make the firework visual effect move with the movement of the finger to achieve the effect of the fingertip firework.

For example, in some embodiments, the step S21 can include: mapping the center of the firework visual effect to any point in a target region centered on the target position so that the firework visual effect is superimposed on the target position. In one embodiment, the firework visual effect can be superimposed on the target position by using the AR technology.

For example, the specific size of the target region can be set according to the actual conditions, for example, in some embodiments, the target region can be a circular region, and the center of the circular region is the target position, and the radius of the circular region can include 100 pixels. The target region can be a rectangular region, a trapezoidal region, or an irregularly shaped region.

For example, the firework visual effect can be superimposed on any point in the target region centered on the target position (the feature point on the target object or any trajectory point) in the to-be-processed video, and the center part of the firework visual effect can only move in the target region and cannot move outside the target region, and the spark part of the firework visual effect can move from the center part along a path away from the center part, so that, visually, the effect that the center part of the firework visual effect is kept unmoved and the spark part of the firework visual effect flutters outward is achieved. It is to be noted that, in some embodiments, there can be a plurality of target positions in the to-be-processed video, that is, the firework visual effect can be displayed at a plurality of positions in the to-be-processed video.

For example, the target object can be the hand, and the target point can be the fingertip of the hand, and the video generation method further includes: displaying the firework visual effect at the fingertip. Thus, visually, it can be achieved that the firework visual effect moves with the movement of the fingertip, namely, the visual effect of the fingertip firework is achieved. For example, the fingertip can be the fingertip of the index finger and the like. It is to be noted that the target point can also be determined based on fingertips of at least two fingers on the hand, for example, the target point can be a midpoint of a line connecting the fingertips of the two fingers, etc.

For example, in some embodiments, the visual effect trajectory is a trajectory determined according to the movement of the fingertip of the user, in this case, the user can click the video shooting button in a touch display screen of the electronic device to start shooting a video, or the user can also control video shooting by voice; in case that the shot video includes the fingertip of the user, the firework visual effect can be generated at the fingertip, and if the fingertip does not move, the center part of the firework visual effect is kept unmoved, so that the firework visual effect can be displayed at the fingertip of the user; and if the fingertips move, the center part of the firework visual effect moves on the display screen along with the movement of the fingertip, and thus the firework visual effect moving along with the movement of the finger of the user is displayed in the video. Therefore, the experience of the user in shooting the video or watching the video can be improved.

For example, in other embodiments, the visual effect trajectory can be a preset trajectory, in such condition, the firework visual effect can be triggered based on a specific object in the to-be-processed video being detected, for example, if the specific object is the fingertip and the visual effect trajectory can be the heart-shaped trajectory surrounding the fingertip of the user, in a case that the to-be-processed video includes the fingertip of the user, the firework visual effect can be formed around the fingertip of the user, the firework visual effect can move continuously and cyclically along the heart-shaped trajectory at a certain rate, for example, in a case that the fingertip of the user cannot be detected in the to-be-processed video, for example, when the hand of the user moves out of the display screen, the firework visual effect disappears. For another example, the firework visual effect can also be automatically triggered.

For example, in some embodiments, the step S22 can include: superimposing and rendering the firework visual effect and the to-be-processed video to generate the video with the firework visual effect superimposed.

Figure 6:
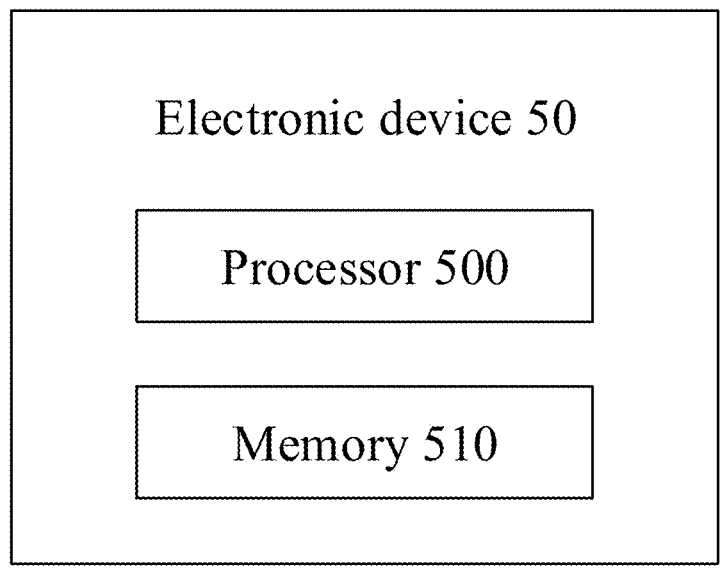
FIG. 6 is a schematic block diagram of an electronic device provided by at least one embodiment of the present disclosure.

Some embodiments of the present disclosure further provide an electronic device. FIG. 6 is a schematic block diagram of an electronic device provided by at least one embodiment of the present disclosure.

For example, as shown in FIG. 6, the electronic device 50 comprises a processor 500 and a memory 510. It should be noted that the components of the electronic device 50 shown in FIG. 6 are only exemplary and are not limiting, and the electronic device 50 can also comprise other components according to actual application requirements.

For example, the processor 500 and the memory 510 can directly or indirectly communicate with each other.

For example, the processor 500 and the memory 510 can communicate through network. The network can include wireless network, wired network, and/or any combination of the wireless network and the wired network. The processor 500 and the memory 510 can also communicate with each other through a system bus, and the present disclosure are not limited thereto.

For example, in some embodiments, the memory 510 is used for non-transiently storing computer readable instructions. The processor 500 is used for running the computer readable instructions, when the computer readable instructions are run by the processor 500, the generation method for generating the firework visual effect according to any one of the above embodiments is achieved. For specific implementation of each step of the generation method for generating the firework visual effect and related interpretation contents, reference may be made to the above embodiments of the generation method for generating the firework visual effect, and repeated parts are not described herein.

For example, in other embodiments, when the computer readable instructions are run by the processor 500, the video generation method according to any one of the above embodiments can also be achieved. For specific implementation of each step of the video generation method and related interpretation contents, reference may be made to the above embodiments of the video generation method, and repeated parts are not described herein.

For example, the processor 500 and the memory 510 can be set up on a server side (or a cloud side).

For example, the processor 500 may control other components in the electronic device 50 to perform desired functions. The processor 500 can be a central processing unit (CPU), a graphics processing unit (GPU), a network processor (NP), and the like; and can also be a digital signal processor (DSP), an application-specific integrated circuit (ASIC), a field-programmable gate array (FPGA), or other programmable logic device, a discrete gate or transistor logic device, or a discrete hardware component. The central processing unit (CPU) can be X86 or ARM architecture, etc.

For example, the memory 510 may include any combination of one or more computer program products, and the computer program products may include various forms of computer readable storage media, such as volatile memory and/or non-volatile memory. The volatile memory may include, for example, a random access memory (RAM) and/or a cache, etc. The non-volatile memory can include, for example, a read-only memory (ROM), a hard disk, an erasable programmable read-only memory (EPROM), a portable compact disk read-only memory (CD-ROM), an USB memory, a flash memory, and the like. One or more computer readable instructions may be stored on the computer-readable storage medium, and the processor 500 may execute the computer readable instructions to implement various functions of the electronic device 50. Various applications, various data, and the like, may also be stored in the storage medium.

For example, in some embodiments, the electronic device 50 can be a mobile phone, a tablet computer, an electronic paper, a television, a monitor, a notebook computer, a digital photo frame, a navigator, a wearable electronic device, a smart home device, and the like.

For example, the electronic device 50 can include a display panel that can be used for displaying the firework visual effects, videos, and the like. For example, the display panel can be a rectangular panel, a circular panel, an elliptical panel, or a polygonal panel, etc. In addition, the display panel may not only be a flat panel, but also a curved panel, or even a spherical panel.

For example, the electronic device 50 can have a touch function, namely, the electronic device 50 can be a touch apparatus.

For example, for the detailed description of the process of the electronic device 50 performing the generation method for generating the firework visual effect and the video generation method, reference may be made to the related descriptions in the embodiments of the generation method for generating the firework visual effect and the video generation method, and the repeated parts are not described herein.

Figure 7:
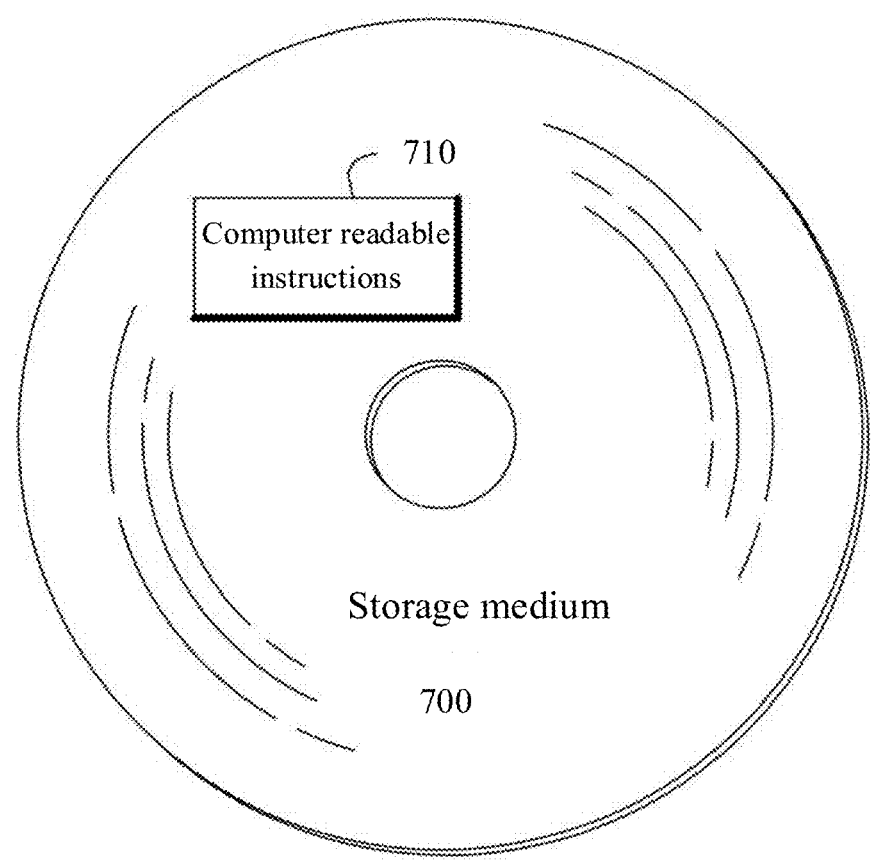
FIG. 7 is a schematic diagram of a non-transient computer readable storage medium provided by at least one embodiment of the present disclosure.

FIG. 7 is a schematic diagram of a non-transient computer readable storage medium provided by at least one embodiment of the present disclosure. For example, as shown in FIG. 7, one or more computer readable instructions 710 can be non-transiently stored on a storage medium 700. For example, when the computer readable instructions 710 are executed by the processor, one or more steps in the above-mentioned generation method for generating the firework visual effect can be performed. For another examples, when the computer readable instructions 710 are executed by the processor, one or more steps in the abovementioned video generation method can also be performed.

For example, the storage medium 700 can be applied to the electronic device 50 described above. For example, the storage medium 700 can include the memory 510 in the electronic device 50.

For example, for the description about the storage medium 700, reference may be made to the description of the memory 510 in the embodiment of the electronic device 50, and repeated parts are not described herein.

Figure 8:
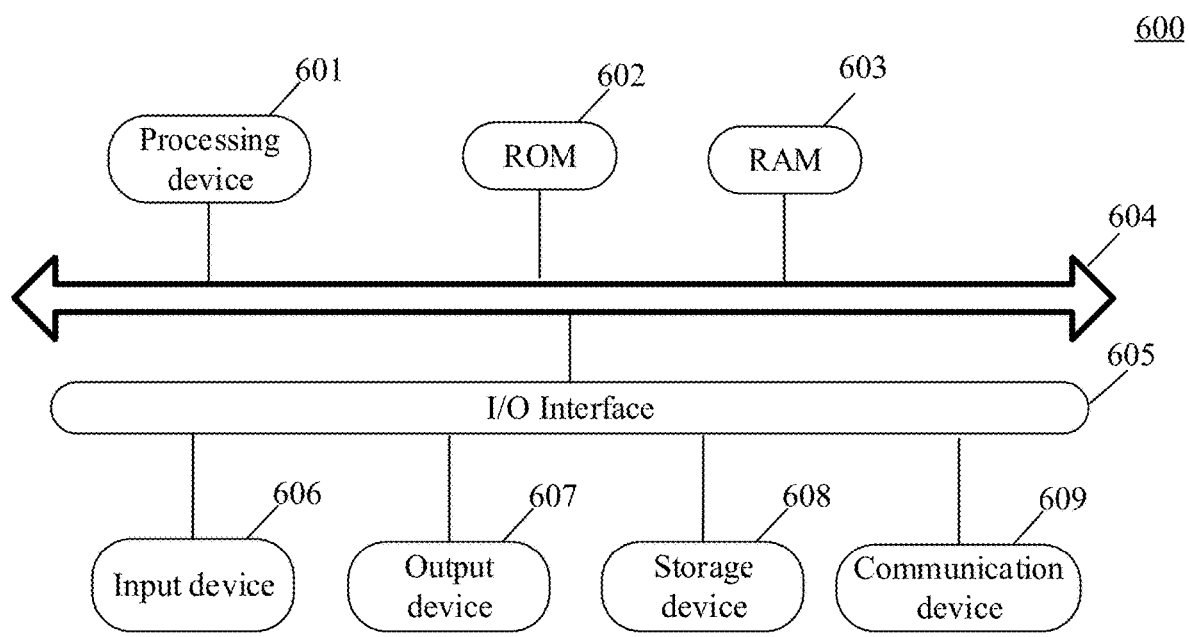
FIG. 8 is a structural schematic diagram of another electronic device provided by at least one embodiment of the present disclosure.

Referring to FIG. 8 below, FIG. 8 shows the structural schematic diagram of the electronic device 600 suitable for implementing the embodiments of the present disclosure. The electronic device in the embodiment of the present disclosure can include, but is not limited to, mobile terminals, such as a mobile phone, a notebook computer, a digital broadcast receiver, a personal digital assistant (PDA), a tablet personal computer (PAD), a portable multimedia player (PMP), a vehicle-mounted terminal (such as vehicle-mounted navigation terminal), and a wearable electronic device, and the like, and fixed terminals, such as a digital TV, a desktop computer, a smart home device, and the like. The electronic device shown in FIG. 8 is only one example and should not impose any limitations on the functions and the application scope of the embodiments of the present disclosure.

As shown in FIG. 8, the electronic device 600 may include a processing device (e.g., a central processing unit, a graphics processing unit, etc.) 601, which can perform various suitable actions and processes according to a program stored in a read-only memory (ROM) 602 or a program loaded from a storage device 608 into a random access memory (RAM) 603, so as to perform one or more steps in the generation method for generating the firework visual effect and/or one or more steps in the video generation method according to the above described embodiments. The RAM 903 further stores various programs and data required for operations of the electronic device 600. The processing device 601, the ROM 602, and the RAM 603 are connected to each other through a bus 604. An input/output (I/O) interface 605 is also connected to the bus 604.

Usually, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a loudspeaker, a vibrator, etc.; a storage device 608 including, for example, a magnetic tape, a hard disk, etc.; and a communication device 609. The communication device 609 may allow the electronic device 600 to communicate wirelessly or by wire with other devices to exchange data. Although FIG. 8 illustrates the electronic device 600 having various devices, it should be understood that it is not required to implement or have all the illustrated devices. More or less devices may be implemented or included alternatively.

Particularly, according to the embodiments of the present disclosure, the process described above with reference to the flowchart can be implemented as a computer software program. For example, the embodiment of the present disclosure includes a computer program product comprising a computer program carried on the non-transitory computer readable medium, the computer program contains program codes for executing the method shown in the flowchart, so as to perform one or more steps in the abovementioned generation method for generating the firework visual effect and/or one or more steps in the abovementioned video generation method. In such embodiments, the computer program can be downloaded and installed from the network via the communication device 609, or installed from the storage device 608, or installed from the ROM 602. When the computer program is executed by the processing device 601, the above-described functions as defined in the methods of the embodiments of the present disclosure are performed.

It needs to be noted that, in the context of the present disclosure, the computer readable medium may be a tangible medium that may contain or store a program for use by or in combination with an instruction execution system, device, or apparatus. The computer readable medium may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

In some embodiments, the client and the server can use any currently known or future developed network protocol such as HTTP (HyperText Transfer Protocol) to communicate, and can be interconnected with the digital data communication (e.g., a communication network) in any form or medium. Examples of the communication network include local area networks ("LAN"), wide area networks ("WAN"), the Internet (e.g., the Internet), and end-to-end networks (e.g., ad hoc end-to-end networks), as well as any currently known or future developed networks.

The above-mentioned computer readable medium may be included in the electronic device described above, or may exist alone without being assembled into the electronic device.

The above-mentioned computer readable medium may carry one or more programs, when the one or more programs are executed by the electronic device, the electronic device is caused to perform the method illustrated in the above embodiments.

Computer program codes for performing the operations in the present disclosure may be written in one or more programming languages or a combination thereof. The abovementioned programming languages include but are not limited to object oriented programming languages, such as Java, Smalltalk, and C++, and also include conventional procedural programming languages, such as "C" language or similar programming languages. The program code can be executed fully on a user's computer, executed partially on a user's computer, executed as an independent software package, executed partially on a user's computer and partially on a remote computer, or executed fully on a remote computer or a server. In the scenario involving a remote computer, the remote computer may be connected to the user's computer through any type of networks including a local area network (LAN) or a wide area network (WAN), or may be connected to an external computer (e.g., connected through the Internet from an Internet Service Provider).

The flowcharts and block diagrams in the accompanying drawings illustrate system architectures, functions, and operations that may be implemented by the system, method, and computer program products according to the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

Related units described in the embodiments of the present disclosure may be implemented by software, or may be implemented by hardware. The name of a unit does not constitute a limitation on the unit itself.

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

According to one or more embodiments of the present disclosure, a generation method for generating a firework visual effect, comprising: generating a center particle set and a spark particle set, where the center particle set is used for forming a center part of the firework visual effect, and the spark particle set is used for forming a spark part moving along a path away from the center part in the firework visual effect; rendering particles in the center particle set to obtain a center particle primitive model set; rendering particles in the spark particle set to obtain a spark particle primitive model set; and superimposing the center particle primitive model set and the spark particle primitive model set to generate the firework visual effect.

According to one or more embodiments of the present disclosure, the center particle set comprises a plurality of center particles; the generating the center particle set comprises: generating the plurality of center particles at a first generation rate, and setting an attribute value of a corresponding center particle attribute for each center particle to obtain a plurality of center particle attribute values, and the center particle attribute comprises any combination of following attributes: particle lifecycle, particle size, particle color, particle transparency, particle mass, particle orientation, particle position, particle speed, and particle rotation angle.

According to one or more embodiments of the present disclosure, the rendering the particles in the center particle set to obtain the center particle primitive model set comprises: respectively rendering the plurality of center particles based on the plurality of center particle attribute values to obtain the center particle primitive model set.

According to one or more embodiments of the present disclosure, the center particle set corresponds to at least one center particle map group; the respectively rendering the plurality of center particles based on the plurality of center particle attribute values to obtain the center particle primitive model set comprises: for each center particle, obtaining a corresponding center particle map group, and rendering the center particle based on the corresponding center particle map group and a corresponding center particle attribute value to obtain a center particle primitive model corresponding to the center particle; and the center particle primitive model set comprises a plurality of center particle primitive models corresponding to the plurality of center particles, respectively.

According to one or more embodiments of the present disclosure, the plurality of center particles comprise a plurality of first center particles, the at least one center particle map group comprises a first center particle map group, and the plurality of first center particles correspond to the first center particle map group; the first center particle map group comprises a plurality of first center maps; and the generation method further comprises: switching the plurality of first center maps according to a preset switching frequency for each first center particle to render the first center particle so as to obtain a center particle primitive model corresponding to the first center particle.

According to one or more embodiments of the present disclosure, the plurality of first center maps comprise at least two first center maps which are different from each other.

According to one or more embodiments of the present disclosure, the particle size corresponding to each first center particle changes in the particle lifecycle of the each first center particle.

According to one or more embodiments of the present disclosure, the plurality of center particles further comprise a plurality of second center particles, the at least one center particle map group comprises a second center particle map group, and the plurality of second center particles correspond to the second center particle map group; a value of the particle transparency corresponding to each second center particle is smaller than a value of the particle transparency corresponding to each first center particle; and the particle color corresponding to each second center particle is different from the particle color corresponding to each first center particle.

According to one or more embodiments of the present disclosure, each center particle is rendered multiple times, and in each rendering process, a center map, which is adopted, in the corresponding center map group has a random rotation angle, in a plane facing the virtual camera adopted for rendering, around the normal of the plane.

According to one or more embodiments of the present disclosure, the spark particle set comprises a plurality of spark particles; the generating the spark particle set comprises: generating the plurality of spark particles; and setting an attribute value of a corresponding spark particle attribute for each spark particle to obtain a plurality of spark particle attribute values; the spark particle attribute comprises any combination of following attributes: particle lifecycle, particle size, particle color, particle transparency, particle mass, particle orientation, particle position, particle speed, and particle rotation angle.

According to one or more embodiments of the present disclosure, the rendering the particles in the spark particle set to obtain the spark particle primitive model set comprises: respectively rendering the plurality of spark particles based on the plurality of spark particle attribute values to obtain the spark particle primitive model set.

According to one or more embodiments of the present disclosure, the spark particle set corresponds to at least one spark particle map group; the respectively rendering the plurality of spark particles based on the plurality of spark particle attribute values to obtain the spark particle primitive model set comprises: for each spark particle, obtaining a corresponding spark particle map group, and rendering the spark particle based on the corresponding spark particle map group and a corresponding spark particle attribute value to obtain a spark particle primitive model corresponding to the spark particle; and the spark particle primitive model set comprises a plurality of spark particle primitive models corresponding to the plurality of spark particles, respectively.

According to one or more embodiments of the present disclosure, the plurality of spark particles comprise a plurality of first spark particles, a plurality of second spark particles, and a plurality of third spark particles; the generating the plurality of spark particles comprises: generating the plurality of first spark particles and the plurality of third spark particles at a second generation rate; and generating the plurality of second spark particles at a third generation rate, and the third generation rate is greater than the second generation rate.

According to one or more embodiments of the present disclosure, the at least one spark particle map group comprises a trailing spark map group, the plurality of second spark particles correspond to the trailing spark map group, and the trailing spark map group comprises at least one trailing spark map; and each second spark particle is rendered multiple times, and in each rendering process, a rotation direction of a corresponding trailing spark map, which is adopted, is adjusted based on a motion direction of the second spark particle, so that a trailing direction of the corresponding trailing spark map is opposite to the motion direction of the second spark particle.

According to one or more embodiments of the present disclosure, the particle color corresponding to each first spark particle is kept unchanged in the particle lifecycle of each first spark particle, and the particle color corresponding to each second spark particle changes in the particle lifecycle of each second spark particle; the particle color corresponding to each third spark particle changes in the particle lifecycle of each third spark particle, the particle rotation angle corresponding to each third spark particle rotates from an initial rotation angle to a final rotation angle, and a difference between the initial rotation angle and the final rotation angle is within an angle threshold.

According to one or more embodiments of the present disclosure, each spark particle is rendered multiple times, and in each rendering process, a spark map, which is adopted, in the corresponding spark map group has a random rotation angle, in a plane facing the virtual camera adopted for rendering, around the normal of the plane.

According to one or more embodiments of the present disclosure, in the particle lifecycle of each spark particle, the particle transparency corresponding to the spark particle gradually becomes completely transparent, and the particle size corresponding to the spark particle gradually decreases to be 0.

According to one or more embodiments of the present disclosure, the center particle primitive model set comprises a plurality of center particle primitive models, and the spark particle primitive model set comprises a plurality of spark particle primitive models; the superimposing the center particle primitive model set and the spark particle primitive model set to generate the firework visual effect comprises: determining at least one center particle primitive model in the center particle primitive models set, the at least one center particle primitive model corresponding to each other; determining at least one spark particle primitive model corresponding to the at least one center particle primitive model; and superimposing a center of the at least one center particle primitive model and a center of the at least one spark particle primitive model to generate a sub-visual effect of the firework visual effect, the firework visual effect is composed of a plurality of sub-visual effects.

According to one or more embodiments of the present disclosure, the center particle set and the spark particle set both are generated in a three-dimensional space determined based on a virtual three-dimensional coordinate system; initial generation positions of respective particles in the center particle set are same, or an initial generation position of each particle in the center particle set is in a first three-dimensional region comprising an origin of the virtual three-dimensional coordinate system; initial generation positions of respective particles in the spark particle set are same, or an initial generation position of each particle in the spark particle set is in a second three-dimensional region comprising the origin of the virtual three-dimensional coordinate system; and each spark particle in the spark particle set has a particle speed, and the particle speed is a random value within a preset speed range.

According to one or more embodiments of the present disclosure, a video generation method, comprising: determining a target position in a to-be-processed video; displaying a firework visual effect at the target position, the firework visual effect being generated by the generation method of the firework visual effect according to any embodiment of the present disclosure; and generating a video with the firework visual effect superimposed.

According to one or more embodiments of the present disclosure, the displaying the firework visual effect at the target position comprises: mapping a center of the firework visual effect to any point in a target region centered on the target position so that the firework visual effect is superimposed on the target position.

According to one or more embodiments of the present disclosure, the determining the target position in the to-be-processed video comprises: in response to detecting a target object in the to-be-processed video, identifying a feature point on the target object as the target position, or determining a visual effect trajectory in the to-be-processed video and selecting any trajectory point on the visual effect trajectory as the target position.

According to one or more embodiments of the present disclosure, the visual effect trajectory comprises a moving trajectory of the feature point on the target object.

According to one or more embodiments of the present disclosure, the target object comprises a hand, and the target position comprises a fingertip of the hand; and the video generation method further comprises: displaying the firework visual effect at the fingertip, and the firework visual effect moves with movement of the fingertip.

According to one or more embodiments of the present disclosure, an electronic device, comprising: a memory for non-transiently storing computer readable instructions; and a processor for running the computer readable instructions, and when the computer readable instructions are run by the processor, the generation method of the firework visual effect according to any embodiment of the present disclosure is implemented.

According to one or more embodiments of the present disclosure, a non-transient computer readable storage medium, the non-transient computer readable storage medium stores computer readable instructions, and when the computer readable instructions are run by the processor, the generation method of the firework visual effect according to any embodiment of the present disclosure is implemented.

The above descriptions are merely the preferred embodiments of the present disclosure and the explanations of the technical principles involved. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed (but not limited thereto) in the present disclosure to form new technical solutions.

In addition, while operations have been described in a particular order, it shall not be construed as requiring that these operations are performed in the shown particular order or in a sequential order. Under certain circumstances, multitasking and parallel processing may be advantageous. Similarly, while some specific implementation details are included in the above discussions, these shall not be interpreted as limiting the scope of the present disclosure. Some features described in the context of a separate embodiment may also be implemented in combination in a single embodiment. Conversely, various features described in the context of a single embodiment may also be implemented in various embodiments individually or in a plurality of embodiments in any appropriate sub-combination.

Although the present subject matter has been described in a language specific to structural features and/or logical method acts, it will be appreciated that the subject matter defined in the appended claims is not necessarily limited to the particular features or acts described above. Rather, the particular features and acts described above are merely exemplary forms for implementing the claims.

For the present disclosure, the following statements should be noted:
(1) the accompanying drawings of the embodiment(s) of the present disclosure relate only to the structure(s) in connection with the embodiment(s) of the present disclosure, and other structure(s) can refer to common design(s);
(2) for the purpose of clarity only, in accompanying drawings for illustrating the embodiment(s) of the present disclosure, the thickness and size of a layer or a structure may be enlarged. However, it should understood that, in the case in which a component or element such as a layer, film, region, substrate, or the like is referred to be "on" or "under" another component or element, it may be directly on or under the another component or element or a component or element is interposed therebetween; and
(3) in case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

The invention claimed is:
1. A generation method for generating a firework visual effect, comprising:
generating a center particle set and a spark particle set, wherein the center particle set is used for forming a center part of the firework visual effect, and the spark particle set is used for forming a spark part moving along a path away from the center part in the firework visual effect;
rendering particles in the center particle set to obtain a center particle primitive model set;
rendering particles in the spark particle set to obtain a spark particle primitive model set; and
superimposing the center particle primitive model set and the spark particle primitive model set to generate the firework visual effect;
wherein the center particle set comprises a plurality of center particles;
the generating the center particle set comprises:
generating the plurality of center particles at a first generation rate, and
setting an attribute value of a corresponding center particle attribute for each center particle to obtain a plurality of center particle attribute values;
wherein the rendering the particles in the center particle set to obtain the center particle primitive model set comprises:
respectively rendering the plurality of center particles based on the plurality of center particle attribute values to obtain the center particle primitive model set;

wherein the center particle set corresponds to at least one center particle map group;

the respectively rendering the plurality of center particles based on the plurality of center particle attribute values to obtain the center particle primitive model set comprises:

for each center particle, obtaining a corresponding center particle map group, and rendering the center particle based on the corresponding center particle map group and a corresponding center particle attribute value to obtain a center particle primitive model corresponding to the center particle; and wherein the center particle primitive model set comprises a plurality of center particle primitive models corresponding to the plurality of center particles, respectively.

2. The generation method according to claim 1, wherein the center particle attribute comprises any combination of following attributes: particle lifecycle, particle size, particle color, particle transparency, particle mass, particle orientation, particle position, particle speed, and particle rotation angle.

3. The generation method according to claim 2, wherein the plurality of center particles comprise a plurality of first center particles, the at least one center particle map group comprises a first center particle map group, and the plurality of first center particles correspond to the first center particle map group;

wherein the first center particle map group comprises a plurality of first center maps; and the generation method further comprises:

switching the plurality of first center maps according to a preset switching frequency for each first center particle to render the first center particle so as to obtain a center particle primitive model corresponding to the first center particle;

wherein the plurality of first center maps comprise at least two first center maps which are different from each other; and wherein the particle size corresponding to each first center particle changes in the particle lifecycle of the each first center particle.

4. The generation method according to claim 3, wherein the plurality of center particles further comprise a plurality of second center particles, the at least one center particle map group comprises a second center particle map group, and the plurality of second center particles correspond to the second center particle map group;

a value of the particle transparency corresponding to each second center particle is smaller than a value of the particle transparency corresponding to each first center particle; and the particle color corresponding to each second center particle is different from the particle color corresponding to each first center particle.

5. The generation method according to claim 1, wherein each center particle is rendered multiple times, and in each rendering process, a center map, which is adopted, in the corresponding center particle map group has a random rotation angle, in a plane facing a virtual camera adopted for rendering, around a normal of the plane.

6. The generation method according to claim 1, wherein the spark particle set comprises a plurality of spark particles;

the generating the spark particle set comprises:

generating the plurality of spark particles; and setting an attribute value of a corresponding spark particle attribute for each spark particle to obtain a plurality of spark particle attribute values;

wherein the spark particle attribute comprises any combination of following attributes: particle lifecycle, particle size, particle color, particle transparency, particle mass, particle orientation, particle position, particle speed, and particle rotation angle; and wherein the rendering the particles in the spark particle set to obtain the spark particle primitive model set comprises:

respectively rendering the plurality of spark particles based on the plurality of spark particle attribute values to obtain the spark particle primitive model set.

7. The generation method according to claim 6, wherein the spark particle set corresponds to at least one spark particle map group;

the respectively rendering the plurality of spark particles based on the plurality of spark particle attribute values to obtain the spark particle primitive model set comprises:

for each spark particle, obtaining a corresponding spark particle map group, and rendering the spark particle based on the corresponding spark particle map group and a corresponding spark particle attribute value to obtain a spark particle primitive model corresponding to the spark particle; and wherein the spark particle primitive model set comprises a plurality of spark particle primitive models corresponding to the plurality of spark particles, respectively.

8. The generation method according to claim 7, wherein the plurality of spark particles comprise a plurality of first spark particles, a plurality of second spark particles, and a plurality of third spark particles;

the generating the plurality of spark particles comprises:

generating the plurality of first spark particles and the plurality of third spark particles at a second generation rate; and generating the plurality of second spark particles at a third generation rate, wherein the third generation rate is greater than the second generation rate;

wherein the at least one spark particle map group comprises a trailing spark map group, the plurality of second spark particles correspond to the trailing spark map group, and the trailing spark map group comprises at least one trailing spark map; and each second spark particle is rendered multiple times, and in each rendering process, a rotation direction of a corresponding trailing spark map, which is adopted, is adjusted based on a motion direction of the second spark particle, so that a trailing direction of the corresponding trailing spark map is opposite to the motion direction of the second spark particle.

9. The generation method according to claim 8, wherein the particle color corresponding to each first spark particle is kept unchanged in the particle lifecycle of each first spark particle, and the particle color corresponding to each second spark particle changes in the particle lifecycle of each second spark particle;

the particle color corresponding to each third spark particle changes in the particle lifecycle of each third spark particle, the particle rotation angle corresponding to each third spark particle changes from an initial rotation angle to a final rotation angle, and a difference between the initial rotation angle and the final rotation angle is within a range defined by an angle threshold.

10. The generation method according to claim 7, wherein each spark particle is rendered multiple times, and in each rendering process, a spark map, which is adopted, in the corresponding spark particle map group has a random rotation angle, in a plane facing a virtual camera adopted for rendering, around a normal of the plane.

11. The generation method according to claim 6, wherein in the particle lifecycle of each spark particle, the particle transparency corresponding to the spark particle gradually becomes completely transparent, and the particle size corresponding to the spark particle gradually decreases to be 0.

12. The generation method according to claim 1, wherein the spark particle primitive model set comprises a plurality of spark particle primitive models;
the superimposing the center particle primitive model set and the spark particle primitive model set to generate the firework visual effect comprises:
determining at least one center particle primitive model in the center particle primitive model set, wherein the at least one center particle primitive model corresponds to each other;
determining at least one spark particle primitive model corresponding to the at least one center particle primitive model; and
superimposing a center of the at least one center particle primitive model and a center of the at least one spark particle primitive model to generate a sub-visual effect of the firework visual effect; and
wherein the firework visual effect is composed of a plurality of sub-visual effects.

13. The generation method according to claim 1, wherein the center particle set and the spark particle set both are generated in a three-dimensional space determined based on a virtual three-dimensional coordinate system;
initial generation positions of respective particles in the center particle set are same, or an initial generation position of each particle in the center particle set is in a first three-dimensional region comprising an origin of the virtual three-dimensional coordinate system;
initial generation positions of respective particles in the spark particle set are same, or an initial generation position of each particle in the spark particle set is in a second three-dimensional region comprising the origin of the virtual three-dimensional coordinate system; and
each spark particle in the spark particle set has a particle speed, and the particle speed is a random value within a preset speed range.

14. A non-transitory computer readable storage medium, wherein the non-transitory computer readable storage medium stores computer readable instructions, and when the computer readable instructions are run by a processor, the generation method according to claim 1 is implemented.

15. A video generation method, comprising:
determining a target position in a to-be-processed video;
displaying a firework visual effect at the target position; and
generating a video with the firework visual effect superimposed;
wherein the firework visual effect is generated by a generation method, and the generation method comprises;
generating a center particle set and a spark particle set, wherein the center particle set is used for forming a center part of the firework visual effect, and the spark particle set is used for forming a spark part moving along a path away from the center part in the firework visual effect;
rendering particles in the center particle set to obtain a center particle primitive model set;
rendering particles in the spark particle set to obtain a spark particle primitive model set; and
superimposing the center particle primitive model set and the spark particle primitive model set to generate the firework visual effect;
wherein the center particle set comprises a plurality of center particles;
the generating the center particle set comprises:
generating the plurality of center particles at a first generation rate, and
setting an attribute value of a corresponding center particle attribute for each center particle to obtain a plurality of center particle attribute values;
wherein the rendering the particles in the center particle set to obtain the center particle primitive model set comprises:
respectively rendering the plurality of center particles based on the plurality of center particle attribute values to obtain the center particle primitive model set;
wherein the center particle set corresponds to at least one center particle map group;
the respectively rendering the plurality of center particles based on the plurality of center particle attribute values to obtain the center particle primitive model set comprises:
for each center particle, obtaining a corresponding center particle map group, and rendering the center particle based on the corresponding center particle map group and a corresponding center particle attribute value to obtain a center particle primitive model corresponding to the center particle; and
wherein the center particle primitive model set comprises a plurality of center particle primitive models corresponding to the plurality of center particles, respectively.

16. The video generation method according to claim 15, wherein the displaying the firework visual effect at the target position comprises:
mapping a center of the firework visual effect to any point in a target region centered on the target position so that the firework visual effect is superimposed on the target position.

17. The video generation method according to claim 15, wherein the determining the target position in the to-be-processed video comprises:
in response to detecting a target object in the to-be-processed video, identifying a feature point on the target object as the target position, or
determining a visual effect trajectory in the to-be-processed video, and selecting any trajectory point on the visual effect trajectory as the target position;
wherein the visual effect trajectory comprises a moving trajectory of the feature point on the target object.

18. The video generation method according to claim 17, wherein the target object comprises a hand, and the target position comprises a fingertip of the hand; and
the video generation method further comprises:
displaying the firework visual effect at the fingertip, wherein the firework visual effect moves with movement of the fingertip.

19. An electronic device, comprising:
a memory for non-transitory storing computer readable instructions; and
a processor for running the computer readable instructions, wherein when the computer readable instructions are run by the processor, a generation method for generating a firework visual effect is implemented;
wherein the generation method comprises:
generating a center particle set and a spark particle set, wherein the center particle set is used for forming a center part of the firework visual effect, and the spark particle set is used for forming a spark part moving along a path away from the center part in the firework visual effect;
rendering particles in the center particle set to obtain a center particle primitive model set;
rendering particles in the spark particle set to obtain a spark particle primitive model set; and
superimposing the center particle primitive model set and the spark particle primitive model set to generate the firework visual effect;
wherein the center particle set comprises a plurality of center particles;
the generating the center particle set comprises:
generating the plurality of center particles at a first generation rate, and
setting an attribute value of a corresponding center particle attribute for each center particle to obtain a plurality of center particle attribute values;
wherein the rendering the particles in the center particle set to obtain the center particle primitive model set comprises:
respectively rendering the plurality of center particles based on the plurality of center particle attribute values to obtain the center particle primitive model set;
wherein the center particle set corresponds to at least one center particle map group;
the respectively rendering the plurality of center particles based on the plurality of center particle attribute values to obtain the center particle primitive model set comprises:
for each center particle, obtaining a corresponding center particle map group, and rendering the center particle based on the corresponding center particle map group and a corresponding center particle attribute value to obtain a center particle primitive model corresponding to the center particle; and
wherein the center particle primitive model set comprises a plurality of center particle primitive models corresponding to the plurality of center particles, respectively.

* * * * *